(12) United States Patent
Kang

(10) Patent No.: US 11,132,574 B2
(45) Date of Patent: Sep. 28, 2021

(54) METHOD FOR DETECTING MARKER AND ELECTRONIC DEVICE THEREOF

(71) Applicant: Samsung Electronics Co., Ltd., Gyeonggi-do (KR)

(72) Inventor: Kyoung-Bong Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/476,650

(22) PCT Filed: Jan. 11, 2018

(86) PCT No.: PCT/KR2018/000517
§ 371 (c)(1),
(2) Date: Jul. 9, 2019

(87) PCT Pub. No.: WO2018/131903
PCT Pub. Date: Jul. 19, 2018

(65) Prior Publication Data
US 2020/0160082 A1    May 21, 2020

(30) Foreign Application Priority Data

Jan. 12, 2017  (KR) .................... 10-2017-0005303

(51) Int. Cl.
*G06K 9/32* (2006.01)
*G06T 7/73* (2017.01)
*G06T 7/90* (2017.01)

(52) U.S. Cl.
CPC .............. *G06K 9/3216* (2013.01); *G06T 7/73* (2017.01); *G06T 7/90* (2017.01); *G06K 2009/3225* (2013.01); *G06T 2207/30204* (2013.01)

(58) Field of Classification Search
CPC ....... G06K 2009/3225; G06K 9/00671; G06K 9/18; G06K 9/3216; G06T 2207/30204; G06T 7/73; G06T 7/90
See application file for complete search history.

(56) References Cited

U.S. PATENT DOCUMENTS 8,081,815 B2 * 12/2011 Kotake ..................... G06T 7/73
382/154
8,866,849 B1    10/2014 Cho et al.
(Continued)

FOREIGN PATENT DOCUMENTS

JP    2013-128165 A    6/2013
JP    2014-86875 A     5/2014
(Continued)

*Primary Examiner* — Ian L Lemieux
(74) *Attorney, Agent, or Firm* — Cha & Reiter, LLC

(57) ABSTRACT

The present invention relates to a method for detecting a marker and an electronic device thereof. According to various embodiments of the present invention, the electronic device comprises: at least one sensor; a display; a camera; at least one processor connected with the at least one sensor, the display, and the camera; and a communication circuit coupled with the at least one processor. The at least one processor acquires a first image including a marker displayed on another electronic device through the camera, determines a form of the marker on the basis of analysis information of the first image, and can be set so as to transmit information on the form of the marker to the other electronic device through the communication circuit. Other embodiments are also possible.

14 Claims, 24 Drawing Sheets

(56) References Cited

U.S. PATENT DOCUMENTS

| | | | |
|---|---|---|---|
| 8,934,667 B2* | 1/2015 | Osman | H04N 21/44204 |
| | | | 382/103 |
| 10,013,623 B2* | 7/2018 | Walker | G06K 9/3216 |
| 10,529,300 B1* | 1/2020 | Walters | G06K 19/0614 |
| 10,614,635 B1* | 4/2020 | Walters | G06K 7/1417 |
| 10,614,636 B1* | 4/2020 | Tang | G06T 19/20 |
| 10,867,226 B1* | 12/2020 | Walters | G06K 9/00671 |
| 2011/0304646 A1* | 12/2011 | Kato | A63F 13/525 |
| | | | 345/632 |
| 2014/0119647 A1* | 5/2014 | Cheong | G06T 9/00 |
| | | | 382/166 |
| 2015/0227798 A1 | 8/2015 | Nagano | |
| 2015/0260505 A1 | 9/2015 | Nagano et al. | |
| 2016/0077607 A1 | 3/2016 | Yang et al. | |
| 2016/0078291 A1 | 3/2016 | Kim et al. | |
| 2016/0196692 A1 | 7/2016 | Kjallstrom et al. | |
| 2016/0232715 A1* | 8/2016 | Lee | A63F 13/211 |
| 2017/0061700 A1* | 3/2017 | Urbach | G02B 27/017 |
| 2018/0089522 A1* | 3/2018 | Sami | G06K 19/06037 |
| 2020/0074962 A1* | 3/2020 | Norieda | G06T 7/70 |
| 2020/0098179 A1* | 3/2020 | Gough | G06F 3/013 |
| 2020/0143600 A1* | 5/2020 | Dai | G06T 19/00 |
| 2020/0327670 A1* | 10/2020 | Connor | G06T 7/62 |

FOREIGN PATENT DOCUMENTS

| | | |
|---|---|---|
| JP | 2015-122707 A | 7/2015 |
| KR | 10-2015-0025116 A | 3/2015 |
| KR | 10-2015-0042893 A | 4/2015 |
| KR | 10-2016-0027862 A | 3/2016 |
| KR | 10-2016-0032942 A | 3/2016 |
| WO | 2016/130895 A1 | 8/2016 |

* cited by examiner

METHOD FOR DETECTING MARKER AND ELECTRONIC DEVICE THEREOF

CLAIM OF PRIORITY

This application is a National Phase Entry of PCT International Application No. PCT/KR2018/000517, which was filed on Jan. 11, 2018, and claims a priority to Korean Patent Application No. 10-2017-0005303, which was filed on Jan. 12, 2017, the contents of which are incorporated herein by reference.

TECHNICAL FIELD

Various embodiments of the present invention relate to a method for detecting a marker and an electronic device thereof.

BACKGROUND ART

To provide more various user experience (UX), an electronic device such as a smartphone may provide various functions (e.g., augmented reality (AR)). The AR is a technology which adds an object such as graphics, image, text to an image acquired through a camera of the electronic device. Using the AR, the electronic device may enable a user to perform a function using the corresponding object. To execute the function such as AR, a marker of a particular pattern may be used. The electronic device may synthesize an additional object based on a position of the marker, by detecting the marker in the image.

DISCLOSURE OF INVENTION

Technical Objects

In a function (e.g., augmented reality (AR)) using a marker, a probability of detecting the marker may vary depending on a surrounding environment or a viewing angle. For example, if the surrounding environment is dark, or if there are many similar colors or patterns to the marker, it may be difficult to detect the marker. In addition, it may be difficult to detect the marker according to a slope of the marker.

Various embodiments of the present invention may provide a method for effectively detecting an AR marker and an electronic device thereof.

Various embodiments of the present invention may provide a method for determining a form of an AR marker and an electronic device thereof.

Various embodiments of the present invention may provide a method and an electronic device for adjusting a color of a marker based on color distribution information around a marker and an electronic device thereof.

Technical Solving Means

According to various embodiments of the present invention, an electronic device may include a camera, at least one processor electrically coupled with the camera, and communication circuitry coupled with the at least one processor. The at least one processor may be configured to obtain a first image including a marker displayed at another electronic device through the camera, determine a form of the marker based on analysis information of the first image, and transmit information of the marker form to the another electronic device through the communication circuitry.

An electronic device according to various embodiments of the present invention may include a display, at least one processor electrically coupled with the display, and communication circuitry coupled with the at least one processor. The at least one processor may be configured to display a marker on the display, receive information of a marker form from another electronic device through the communication circuitry, and display a marker changed based on the marker form on the display.

An operating method of an electronic device according to various embodiments of the present invention may include obtaining a first image including a marker displayed at another electronic device, determining a form of the marker based on analysis information of the first image, and transmitting information of the marker form to the another electronic device through the communication circuitry.

Advantageous Effects

A method and an electronic device according to various embodiments of the present invention can improve a recognition rate of a marker by adaptively determining a display form of a marker according to a surrounding environment.

BEST MODE FOR CARRYING OUT THE PRESENT INVENTION

Figure 1:
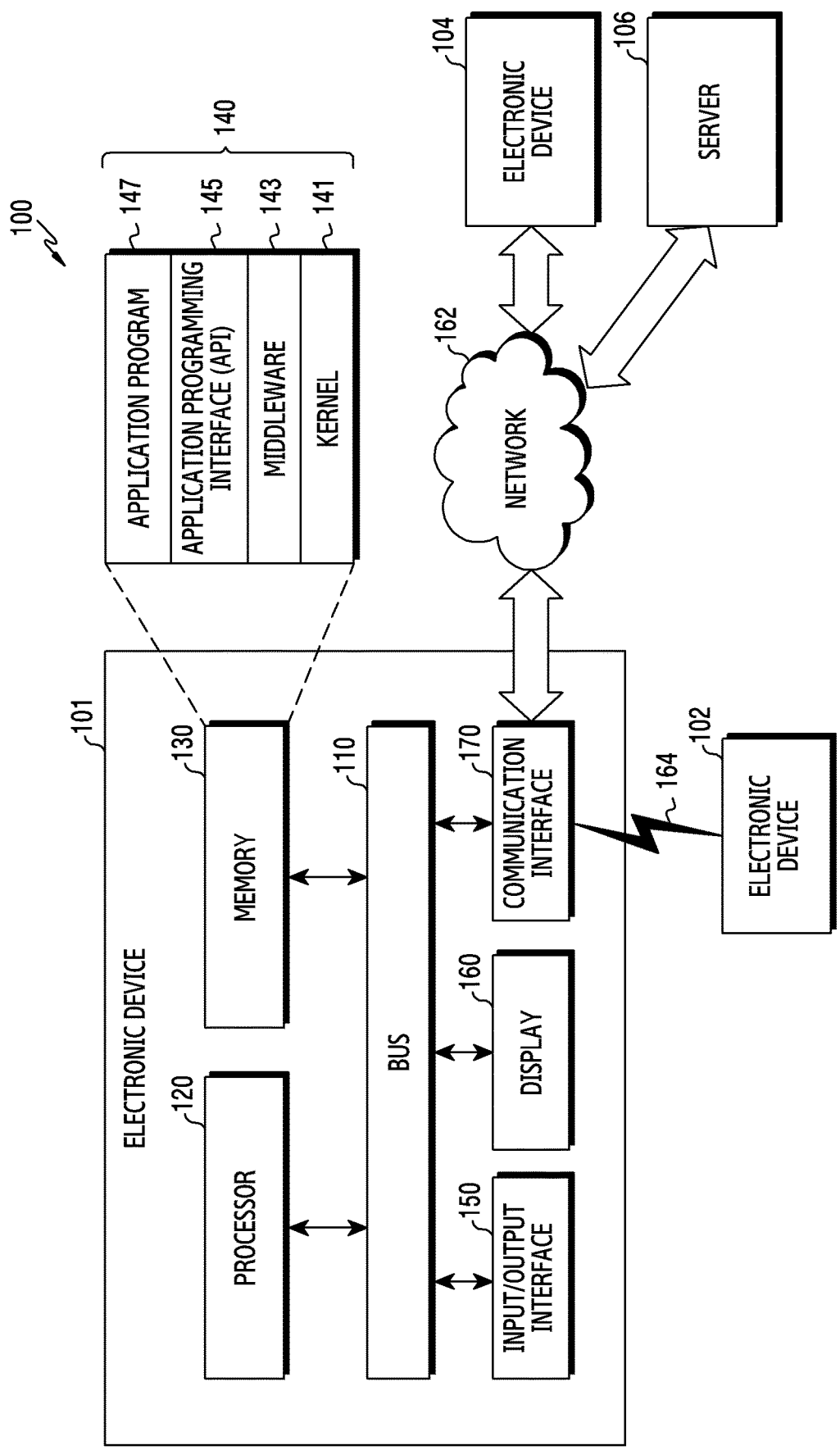
FIG. 1 illustrates an electronic device of a network environment in various embodiments of the present invention.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. Singular forms may include plural forms as well unless the context clearly indicates otherwise. In the present disclosure, the expression "A or B" or "at least one of A or/and B" may include all possible combinations of the items listed. The expression "a first", "a second", "the first", or "the second" used in various embodiments of the present disclosure may modify various components regardless of the order and/or the importance but does not limit the corresponding components. When an element (e.g., first element) is referred to as being (operatively or communicatively) "connected," or "coupled," to another element (e.g., second element), it may be directly connected or coupled directly to the other element or any other element (e.g., third element) may be interposer between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Figure 4:
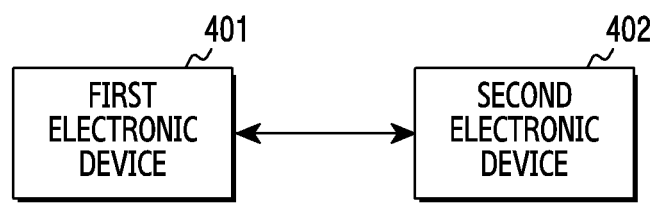
FIG. 4 illustrates an example of a system for detecting a marker according to various embodiments of the present invention.

An electronic device (e.g. a fist electronic device (401) or a second electronic device (402) of FIG. 4) according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame. According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology. Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure. An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements. The bus 110 may include, for example, a circuit for connecting the elements 110-170 and transferring communication (e.g., control messages and/or data) between the elements. The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data. In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program. The API 145 is an interface through which the applications 147 control functions provided from the kernel 141 or the middleware 143, and may include, for example, at least one interface or function (e.g., instruction) for file control, window control, image processing, or text control. The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part. The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may include, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. According to an embodiment, the wireless communication may include, for example, at least one of Wi-Fi, Bluetooth, Bluetooth low energy (BLE), Zigbee, Near Field Communication (NFC), magnetic secure transmission, radio frequency, or body area network (BAN). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used. The server 106, for example, includes at least one of a voice processing server, a voice recognition server, a voice service providing server, a data server, a searching server, a settlement server, a card company server, a bank server, an authentication server, an application server, a management server, an integration server, a provider server (or communication operator server), a content server, an internet server, or cloud server.

Figure 2:
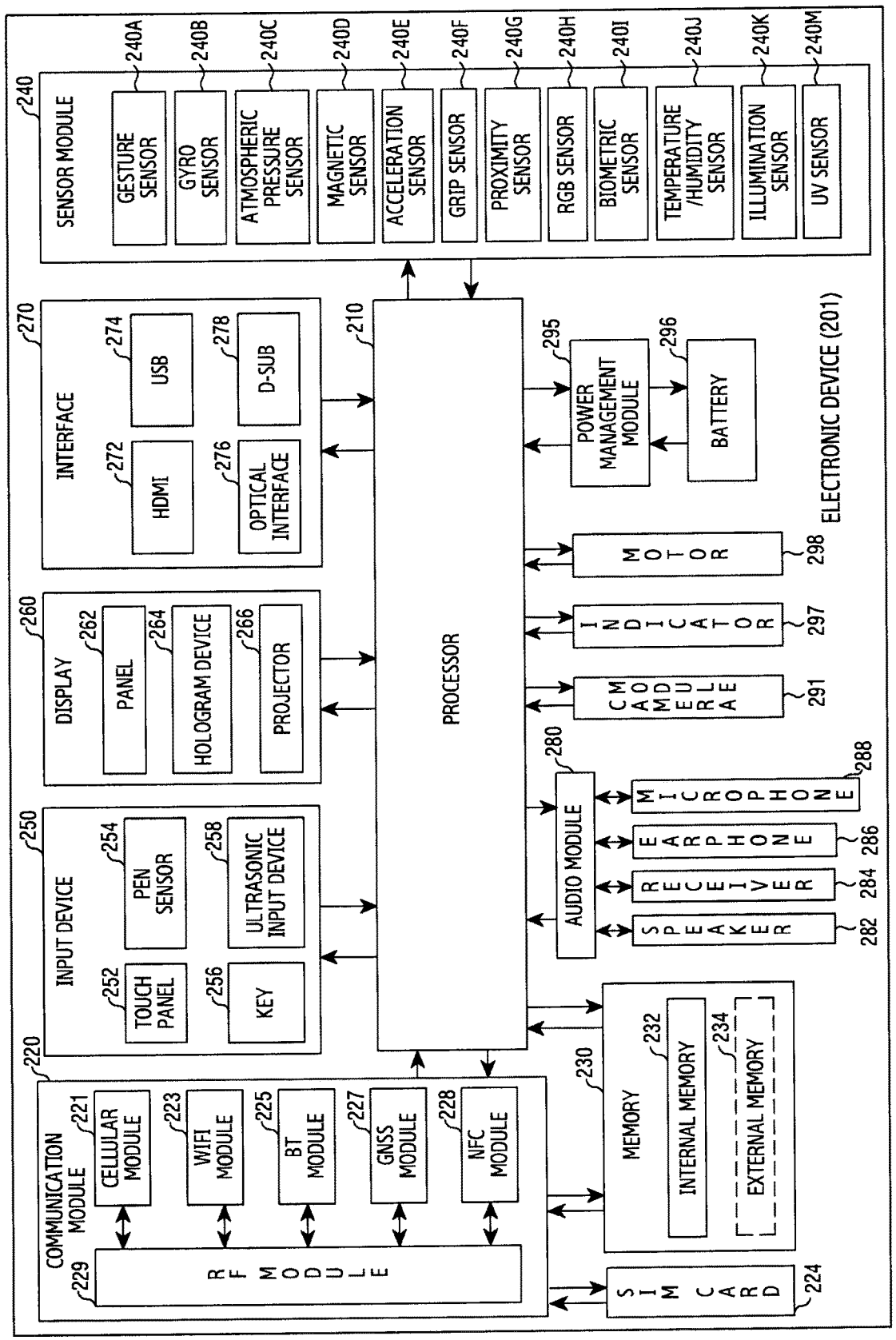
FIG. 2 illustrates a block diagram of an electronic device according to various embodiments of the present invention.

FIG. 2 is a block diagram illustrating an electronic device according to various embodiments of the present disclosure. FIG. 2 is a block diagram of an electronic device 201 according to various embodiments. For example, the electronic apparatus 201 may include the whole or part of the electronic apparatus 101 illustrated in FIG. 1. The electronic device 201 may include at least one processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229. The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP). According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user. The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266. The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like. The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp). The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™. Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
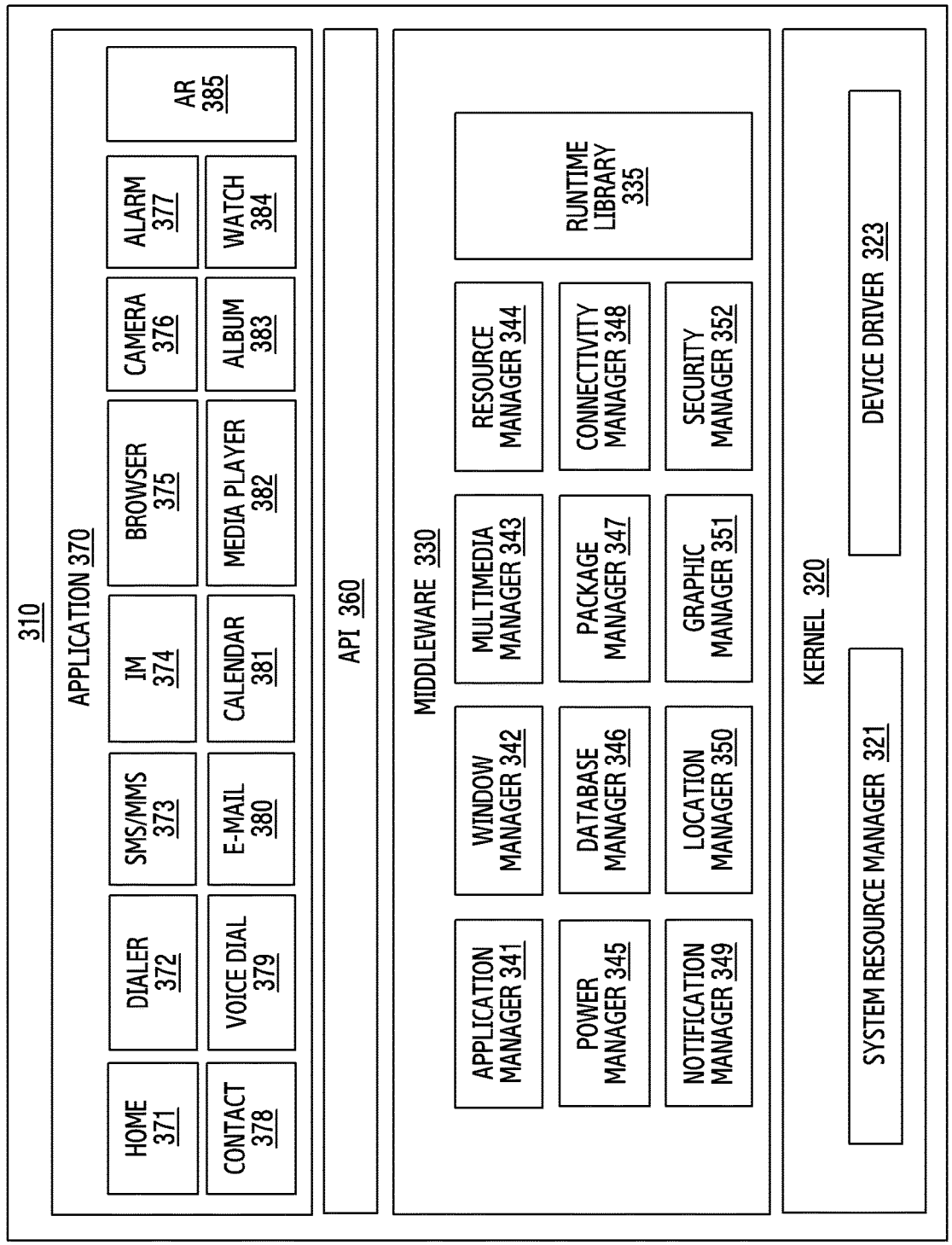
FIG. 3 illustrates a block diagram of a program module according to various embodiments of the present invention.

FIG. 3 is a block diagram of a program module according to various embodiments of the present disclosure. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like. The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like. The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370. The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic apparatus 101) has a telephone call function, the middleware 330 may further include a telephony manager for managing a voice call function or a video call function of the electronic apparatus. The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements. The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, augmented reality (AR) application 385, health care (for example, measure exercise quantity or blood sugar), or environment information (for example, atmospheric pressure, humidity, or temperature information). According to an embodiment of the present disclosure, AR application 385 an application using a marker for AR function. According to an embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device. For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user. The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service). According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS. According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Hereinafter, referring to FIG. 4 through FIG. 12F, a method for detecting a marker and an electronic device thereof according to various embodiments of the present invention are described.

A marker according to various embodiments of the present invention may refer to a specific pattern used in various functions (e.g., augmented reality (AR)). For example, the marker may be used to determine a reference position for synthesizing an additional object in the AR function. The electronic device according to various embodiments of the present invention may detect and recognize a marker having a specific pattern from an image taken by a camera. The electronic device may use in outputting a three-dimensional object or text information on an AR space based on the position of the recognized marker.

FIG. 4 illustrates an example of a system for detecting a marker according to various embodiments of the present invention. The system of FIG. 4 may include a first electronic device 401 or a second electronic device 402. The first electronic device 401 or the second electronic device 402 of FIG. 4 may be an electronic device including substantially the same configuration as the electronic device 101, 102 or 104 of FIG. 1, or the electronic device 201 of FIG. 2. For example, the first electronic device 401 or the second electronic device 402 of FIG. 4 may a device (e.g., a smartphone, a tablet PC, an HMD, a wearable device, or a game console) capable of performing an operation for displaying or detecting the AR marker. For example, if the first electronic device 402 is an HMD and the second electronic device 402 is a wearable device such as a smart watch, the second electronic device 402 may display the marker for various functions (e.g., AR) through a display of the wearable device, a camera of the first electronic device 401 worn on the head captures an image including the marker displayed on a display of the second electronic device 402, and the first electronic device 401 may detect the marker.

According to various embodiments of the present invention, the first electronic device 401 and the second electronic device 402 may exchange information through wired or wireless communication. For example, the first electronic device 401 and the second electronic device 402 may exchange information through the wireless communication such as Bluetooth. For example, the first electronic device 401 may determine a display form of the marker and transmit information of the determined marker form to the second electronic device, and the second electronic device 402 may display the marker based on the received marker form information.

Figure 5:
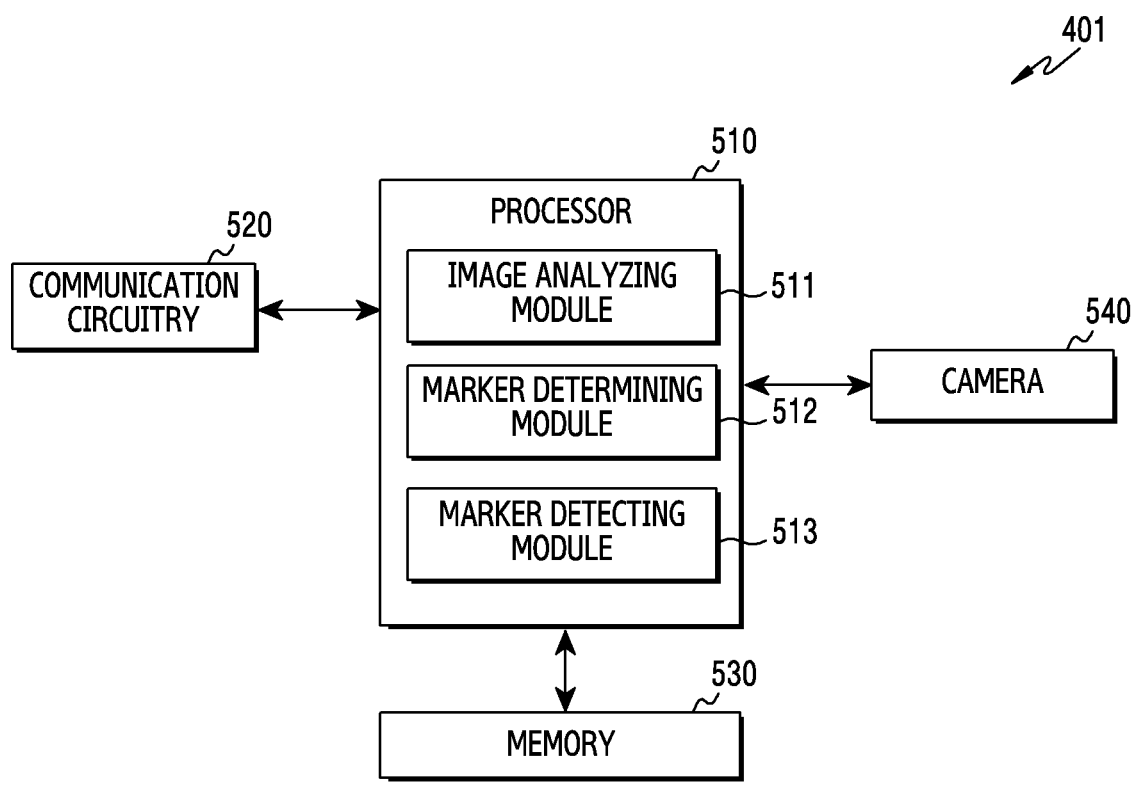
FIG. 5 illustrates an example of a functional block diagram of a first electronic device according to various embodiments of the present invention.

FIG. 5 illustrates an example of a functional block diagram of a first electronic device 401 according to various embodiments of the present invention. A term such as 'portion' or '~er' used in the following indicates a unit for processing at least one function or operation, and may be implemented using hardware, software, or a combination of hardware and software. Referring to FIG. 5, the first electronic device 401 may include a processor 510, communications circuitry 520, a memory 530, and a camera 540. The first electronic device 401 of FIG. 5 may be an electronic device having substantially the same configuration as the first electronic device 101, 102, or 104 of FIG. 1, the electronic device 201 of FIG. 2, or the electronic device 401 and 402 of FIG. 4.

According to various embodiments of the present invention, the processor 510 may be configured to perform a function of processing data and controlling each module of the first electronic device 401. The processor 510 may have the same or similar configuration to, for example, the processor 120 of FIG. 1 or the processor 210 of FIG. 2. The processor 510 according to various embodiments of the present invention may include an image analyzing module 511, a marker determining module 512, and a marker detecting module 512.

According to various embodiments of the present invention, the operation of the first electronic device 401 may be executed by control of the processor 510. The image analyzing module 511, the marker determining module 512, or the marker detecting module 513 may be, as an instruction set or code stored in the storage unit 530, instructions/code resided in the processor 510 at least temporarily or a storage space storing the instructions/code, or part of circuitry of the processor 510.

According to various embodiments of the present invention, the image analyzing module 511 may perform a function for analyzing the image obtained from the second electronic device 402 through the camera 540. For example, the image analyzing module 511 may generate analysis information of the image obtained by the camera 540. According to one embodiment, the analysis information of the image may be information for determining a form of the marker or detecting the marker. For example, the image analysis information may include at least one of color distribution information (e.g., red, green, blue (RGB) histogram data or HSV histogram data) of the image or object information (e.g., Haar-like, histogram of gradient (HOG) data) of the image.

According to various embodiments of the present invention, the marker determining module 512 may determine the form of the marker from the image analysis information generated from the image analyzing module 511. According to one embodiment, the marker determining module 512 may determine the form (e.g., color) of at least a part of the marker based on the image analysis information. For example, the marker determining module 512 may determine a color of lowest distribution as a whole or partial region of the marker from the color distribution information of the image.

According to various embodiments of the present invention, the marker detecting module 513 may perform a function for detecting a marker associated with various functions (e.g., AR function) in the image captured by the camera 540. For example, the marker detecting module 512 may determine a position of the marker from the image captured by the camera 540.

According to various embodiments of the present invention, the communication circuitry 520 may be configured to perform a function of receiving a signal from another electronic device or transmitting a signal to another electronic device. The communication circuitry 520 may include the same or similar configuration to the communication interface 170 of FIG. 1 or the communicating module 220 of FIG. 2. For example, the communication circuitry 520 may transmit information of the marker form determined by the processor 510 to the second electronic device 402. The communication circuitry 520 may receive information of a slope of the second electronic device 402 from the second electronic device 402.

According to various embodiments of the present invention, the memory 530 may perform a function for storing data of the first electronic device 401 or an instruction for the operation of the processor 510. The memory 530 may include substantially the same configuration as the memory 130 of FIG. 1 or the memory 230 of FIG. 2. For example, the memory 530 may store information regarding a marker type or the marker form.

According to various embodiments of the present invention, the camera 540 may perform a function for capturing an image. The camera 540 may include substantially the same configuration as the camera module 291 of FIG. 2. For example, the camera 540 may capture the image including the marker displayed on the second electronic device 402, and provide information of the captured image to the processor 510.

According to various embodiments of the present invention, an electronic device for detecting a marker may be provided. The electronic device may include at least one sensor, a display, a camera, at least one processor coupled with the at least one sensor, the display, and the camera, and communication circuitry coupled with the at least one processor. The at least one processor may be configured to obtain a first image including a marker displayed at another electronic device through the camera, determine a form of the marker based on analysis information of the first image, and transmit information of the marker form to the another electronic device through the communication circuitry.

According to various embodiments of the present invention, the marker may include a first region including a pattern indicating the marker, and a second region of which the form is determined according to the analysis information of the first image.

According to various embodiments of the present invention, the marker may further include a third region of which the form is determined based on a slope of the electronic device and the another electronic device.

According to various embodiments of the present invention, the second region may be formed outside the first region, and the third region may be formed outside the second region.

According to various embodiments of the present invention, the analysis information of the first image may include information of color distribution of the first image.

According to various embodiments of the present invention, the at least one processor may be configured to determine the form of the marker based on the color distribution of the first image.

According to various embodiments of the present invention, the at least one processor may be configured to determine a color having smaller distribution than a specific ratio from the color distribution of the image, and determine the determined color as a color of at least part of the marker.

According to various embodiments of the present invention, the at least one processor may be further configured to obtain information of a slope of the electronic device using the at least one sensor, and transmit the slope information of the electronic device to the another electronic device through the communication circuitry.

According to various embodiments of the present invention, the at least one processor may be configured to obtain information of a slope of the electronic device using the at least one sensor, receive slope information of the another electronic device from the another electronic device through the communication circuitry, identify a relative slope of the electronic device and the another electronic device based on the slope information of the electronic device and the slope information of the another electronic device, and determine the form of the marker based on the relative slope of the electronic device and the another electronic device.

According to various embodiments of the present invention, the at least one processor may be configured to obtain a second image from the camera, and detect a position of the marker in the second image based on at least one of information of the marker form and the analysis information of the first image.

Figure 6:
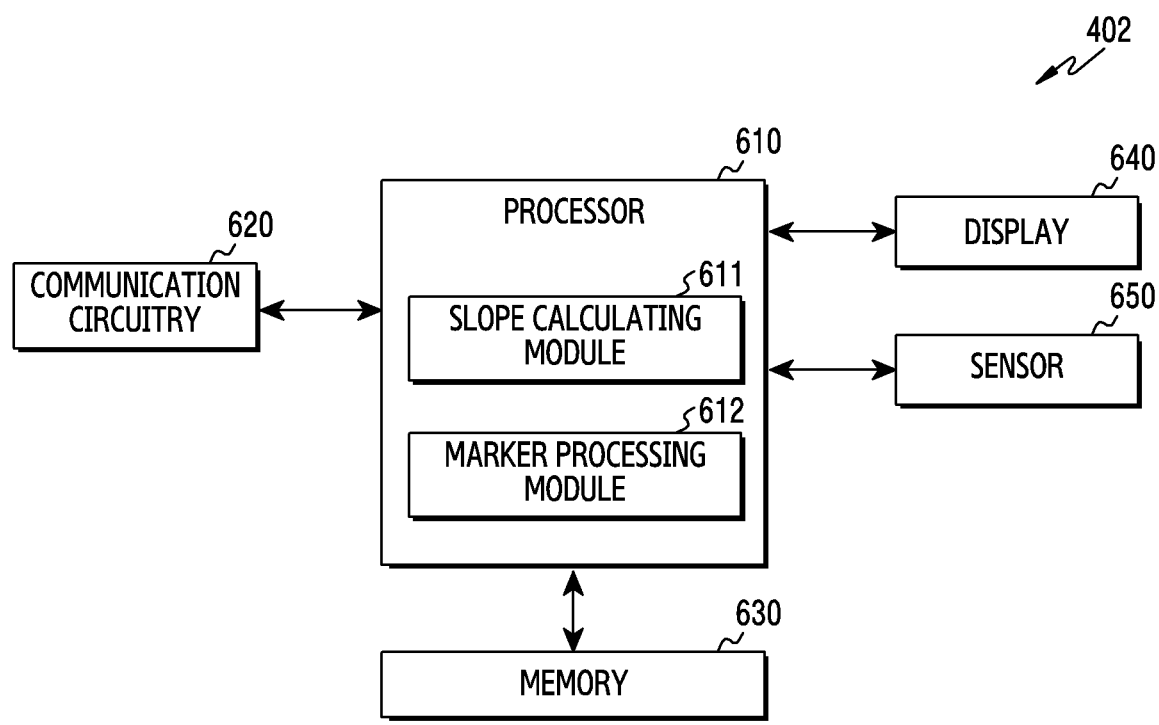
FIG. 6 illustrates an example of a functional block diagram of a second electronic device according to various embodiments of the present invention.

FIG. 6 illustrates an example of a functional block diagram of a second electronic device according to various embodiments of the present invention. The second electronic device 402 according to the embodiment of FIG. 6 may include a processor 610, communications circuitry 620, a memory 630, a display 640, and a sensor 650. The second electronic device 402 of FIG. 6 may be an electronic device including substantially the same configuration as the electronic device 101, 102, or 104 of FIG. 1, the electronic device 201 of FIG. 2, the electronic device 401, 402 of FIG. 5, or the electronic device 401 of FIG. 5.

According to various embodiments of the present invention, the processor 610 may perform a function for processing data of the second electronic device 402 or controlling each component of the second electronic device 402. The processor may include substantially the same configuration as the processor 120 of FIG. 1 or the processor 210 of FIG. 2. According to one embodiment, the operation of the second electronic device 402 may be performed by control of the processor 610. The processor 610 according to one embodiment may include a slope calculating module 611 and a marker processing module 612.

According to various embodiments of the present invention, the slope calculating module 611 may perform a function for calculating a slope of the second electronic device 402. For example, the slope calculating module 611 may calculate a value relating to the slope of the second electronic device, by analyzing a signal provided from the sensor 650.

According to various embodiments of the present invention, the marker processing module 612 may perform a function for displaying the marker. For example, the marker processing module 612 may identify a display form of the marker, and control the display 640 to display the marker according to the form of the marker. According to one embodiment, the marker processing module 612 may identify information regarding the marker display form received from the first electronic device 401 via the communication circuitry 620, and display the marker through the display 640 according to the determined display form. The marker processing module 612 may change the form of the marker by considering the slope information of the second electronic device 402 provided from the slope calculating module 611.

According to various embodiments of the present invention, the communication circuitry 620 may perform a function for the second electronic device 402 to exchange information with other electronic device. For example, the communication circuitry 620 may receive information from the first electronic device 401, or transmit information to the first electronic device 401. The information received from the first electronic device 401 may include information regarding the display form of the marker or slope information of the first electronic device 401. The information transmitted to the first electronic device 401 may include information about the slope of the second electronic device 402.

According to various embodiments of the present invention, the memory 630 may perform a function for storing data of the second electronic device 402. The memory 630 may include substantially the same configuration as the memory 130 of FIG. 1 or the memory 230 of FIG. 2. For example, the memory 530 may store information of the marker to be displayed by the second electronic device 402. The memory 530 may store the AR application 385 of FIG. 3.

According to various embodiments of the present invention, the display 640 may perform a function for outputting information of a visual form on the second electronic device 402. The display 640 may include substantially the same configuration as the display 160 of FIG. 1 or the display 260 of FIG. 2. For example, the display 640 may display the marker according to the display form of the marker identified at the marker processing module 612.

According to various embodiments of the present invention, the sensor 650 may perform a function of generating data for determining the slope of the second electronic device. The sensor 650 may include substantially the same configuration as the second sensor module 240 of FIG. 2. The sensor 650 may include at least one of the gyro sensor 240B or the acceleration sensor 240E. For example, the sensor 650 may generate information of the slope or acceleration of the second electronic device 402 and provide to the processor 610.

According to various embodiments of the present invention, an electronic device for displaying a marker may be provided. The electronic device may include a display, at least one processor coupled with the display, and communication circuitry coupled with the at least one processor. The at least one processor may be configured to receive information of a marker form from another electronic device through the communication circuitry, and display a marker determined based on the marker form information on the display.

According to various embodiments of the present invention, the electronic device may further include at least one sensor, and the at least one processor may determine a slope of the electronic device from the at least one sensor, and determine the form of at least part of the marker based on the slope of the electronic device.

According to various embodiments of the present invention, the at least one processor may receive slope information of the another electronic device from the another electronic device, determine a slope between the electronic device and the another electronic device, by comparing the slope of the electronic device with the slope of the another electronic device, and change the form of at least part of the marker based on the slope between the electronic device and the another electronic device.

According to various embodiments of the present invention, the at least one processor may be configured to identify a form of a panel of the display, and display the marker changed based on the form of the panel of the display and the marker form received from the another electronic device.

The marker displaying and marker detecting processes by the first electronic device 401 and the second electronic device 402 according to various embodiments of the present invention are described.

Figure 7A:
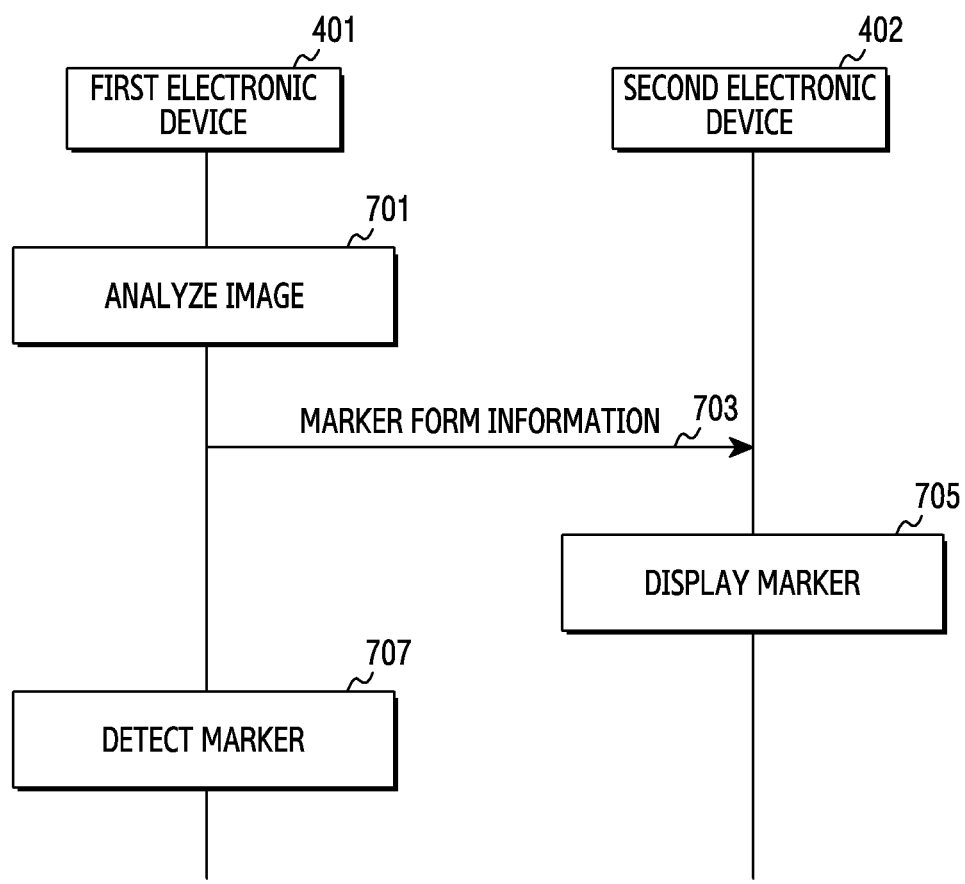
FIG. 7A illustrates an example of a signal flow diagram for detecting a marker according to various embodiments of the present invention.

FIG. 7A may illustrate an example of operations for detecting a marker according to various embodiments of the present invention. The embodiment of FIG. 7A may illustrate the operations for the second electronic device 402 to display the marker and for the first electronic device 401 (e.g., the first electronic device 401 of FIG. 5) to detect the marker displayed at the second electronic device 402 (e.g., the second electronic device 402 of FIG. 6). Although FIG. 7A describes the operations between the first electronic device 401 and the second electronic device 402, which are for the sake of explanations, other additional electronic devices than the first electronic device 401 and the second electronic device 402 may perform the operation of the first electronic device 401 or the second electronic device 402.

Referring to FIG. 7A, in operation 701, the first electronic device 401 may analyze an image. For example, referring to FIG. 7B, the image analyzing module 511 of the first electronic device 401 may obtain an image 711 from the camera 540. The image analyzing module 511 may generate analysis information (e.g., HSV histogram analysis data 712) of the image from the obtained image. The image analyzing module 511 may determine a color 713 of the marker from the histogram analysis data 712. According to one embodiment, the image analyzing module 511 may determine the color (e.g., the color corresponding to the Hue value of zero, red) having the least distribution in the obtained image 711 as the color 713 of the marker. According to another embodiment, the image analyzing module 511 may generate rare color data 714 of the image 711 from the histogram analysis data 712.

In operation 703, the first electronic device 401 may transmit information of the of the determined marker form to the second electronic device 402. According to various embodiments of the present invention, the first electronic device 401 may transmit the marker form (e.g., market color) information determined based on the image analysis information of operation 701 to the second electronic device 402. For example, the first electronic device 401 may transmit the marker form (e.g., the marker color 713) information determined based on the histogram analysis data 712 to the second electronic device 402. Further, in another embodiment, the first electronic device 401 may transmit rare color distribution data 714 generated based on the histogram analysis data 712 to the second electronic device 402. In yet another embodiment, the first electronic device 401 may transmit the obtained image 711 or the histogram analysis data 712 to the second electronic device 402.

In operation 705, the second electronic device 402 may display the marker based on the marker form information received from the first electronic device 401. For example, referring to FIG. 7B, the second electronic device 402 corresponding to the wearable device may display the marker having the color of the least distribution in the surrounding environment. In one embodiment, the second electronic device 402 may display the marker according to the marker form (e.g., the marker color) received from the first electronic device 401. In another embodiment, the second electronic device 402 may determine the marker form based on the color distribution information or the image analysis result received from the first electronic device 401, and display the marker according to the determined marker form.

Figure 7B:
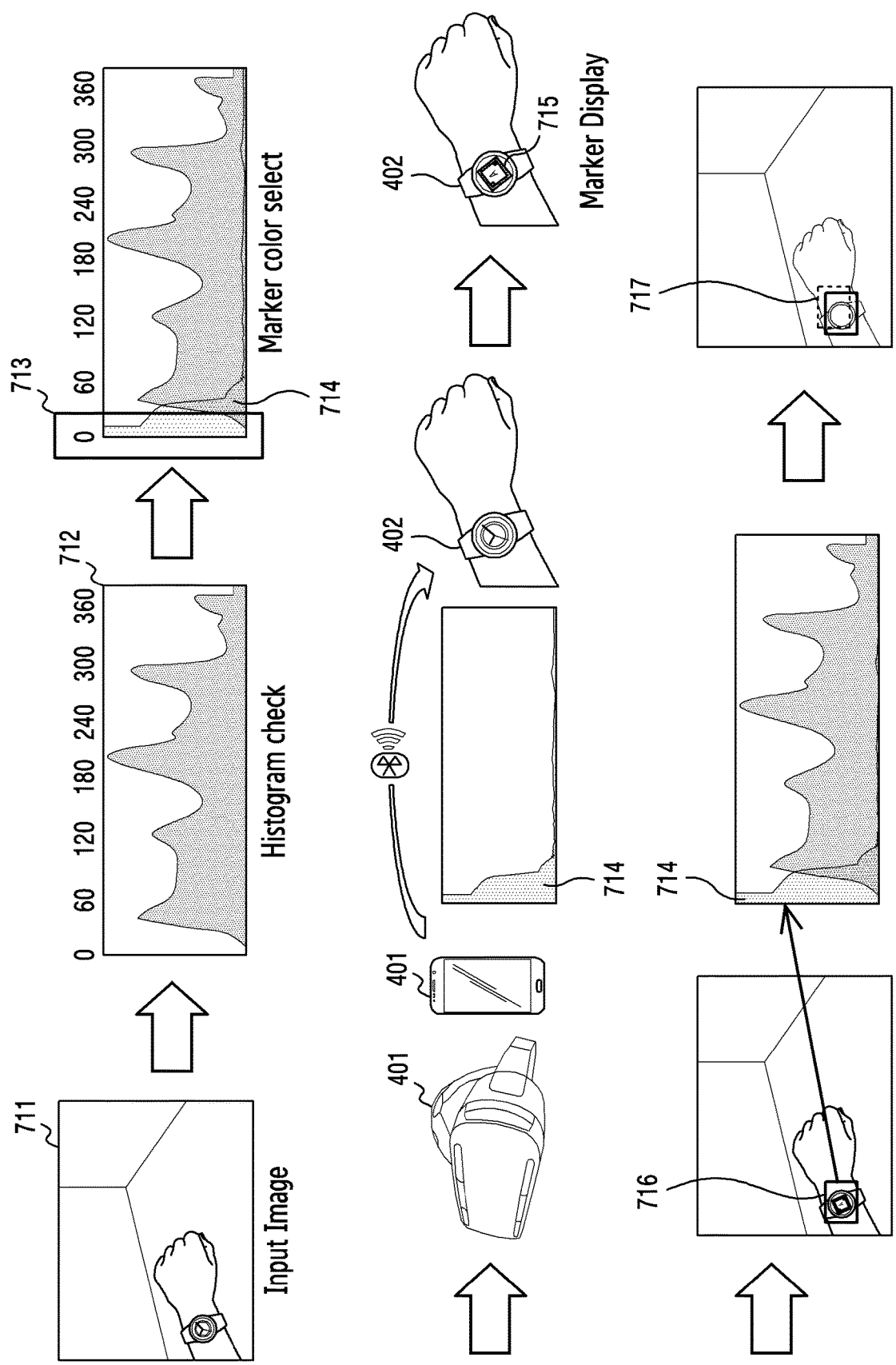
FIG. 7B illustrates an example of a process for detecting the marker according to various embodiments of the present invention.
Figure 7C:
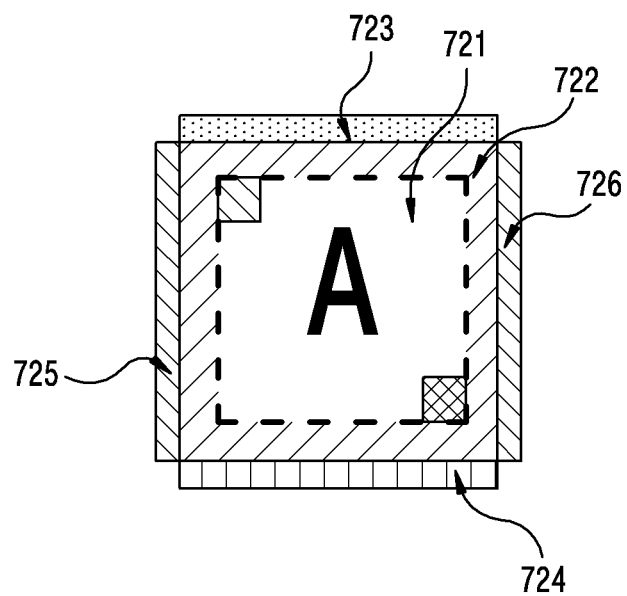
FIG. 7C illustrates an example of the marker according to various embodiments of the present invention.

According to various embodiments of the present invention, the marker may include a plurality of regions. Referring to FIG. 7C, according to various embodiments of the present invention, the marker may include a first region 721, a second region 722, or third regions 723 through 726. For example, the first region 721 may be a region including a unique pattern of the marker. For example, the second region 22 may be a region formed on a rim portion of the first region 721. The form (e.g., color) of the second region 722 may be determined based on the color distribution of the surrounding environment. For example, the color of the second region 722 may be determined to the color of the least distribution of the color distribution of the surrounding environment. For example, the third regions 723 through 726 may be a region formed outside the second region 722. The third regions 723 through 726 may include the upper region 723, the lower region 724, the left region 725, or the right region 726. The form (e.g., color) of the third regions 723 through 726 may be determined according to the slope of the second electronic device 402 or the slope between the first electronic device 401 and the second electronic device 402. For example, the color of the upper region 723 or the lower region 724 may be determined according to an x-axis slope between the first electronic device 401 and the second electronic device 402. The form of the left region 725 or the lower region 726 may be determined according to a z-axis slope between the first electronic device 401 and the second electronic device 402.

Figure 7D:
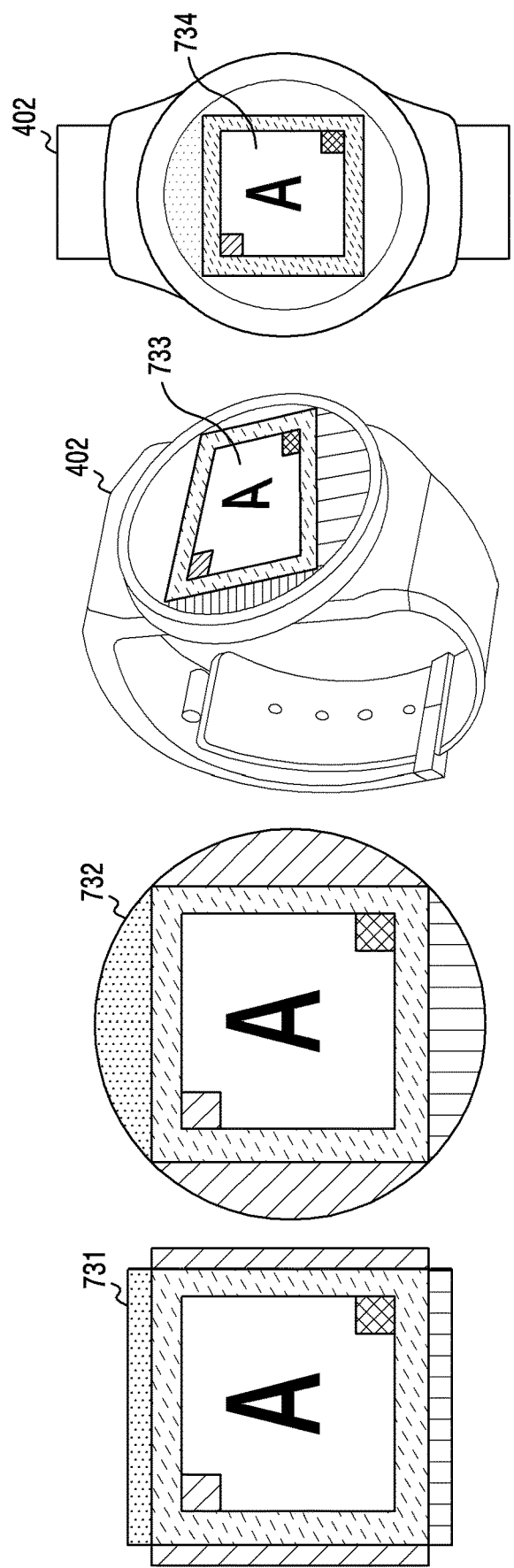
FIG. 7D illustrates an example of a form for displaying the marker according to various embodiments of the present invention.

According to various embodiments of the present invention, the marker may be displayed variously according to the form of the display 640 of the second electronic device 402. Referring to FIG. 7D, if the second electronic device 402 has the display of a square form, a square marker 731 may be outputted on the display 640 of the second electronic device 402. If the second electronic device 402 has a circular display, a circular marker 732 may be outputted on the display 640 of the second electronic device 402. Referring to FIG. 7D, according to one embodiment, markers 733 and 734 having the third region of a modified form (e.g., color) based on the slope of the second electronic device 402 may be displayed.

In operation 707, the marker detecting module 512 of the first electronic device 401 may detect the marker. For example, the marker detecting module 512 may identify a position of the marker displayed on the display of the second electronic device 402 from the image obtained from the camera 540. Referring to FIG. 7B, the marker detecting module 512 may identify that the specific region 716 includes the color 714 determined to have the least distribution in the captured image. The marker detecting module 512 may identify a position 717 of the marker having a specific pattern in the specific region 716 in the image.

Figure 8:
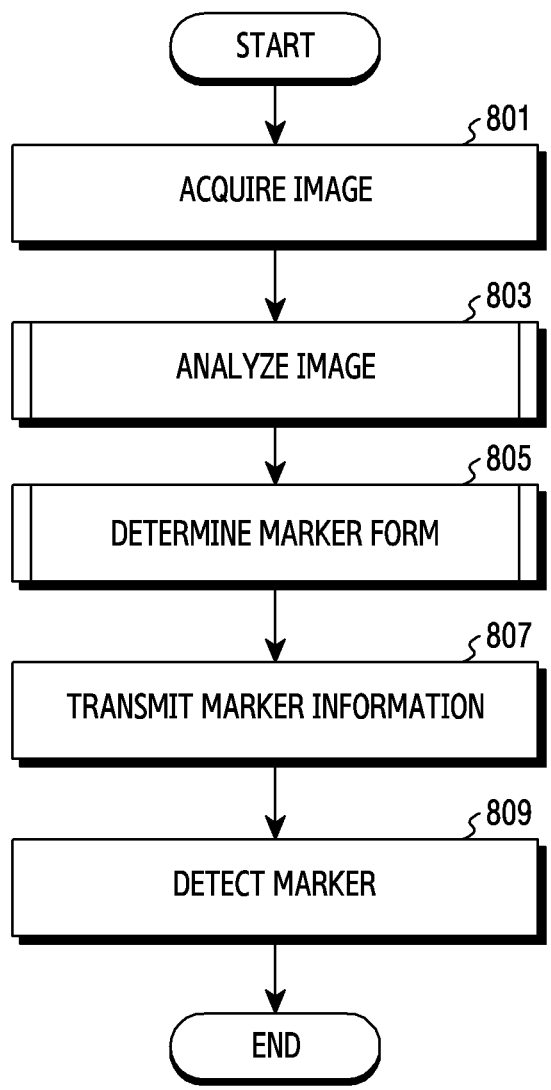
FIG. 8 illustrates an example of a flowchart for detecting a marker in a first electronic device according to various embodiments of the present invention.

FIG. 8 illustrates an example of a flowchart for detecting a marker in a first electronic device according to various embodiments of the present invention. FIG. 8 may illustrate an operating method of the first electronic device 401.

Referring to FIG. 8, in operation 801, the first electronic device 401 (e.g., the electronic device 101, 102, or 104 of FIG. 1, the electronic device 201 of FIG. 2, the electronic device 401, 402 of FIG. 4, or the electronic device 401 of FIG. 5) may acquire an image using the camera 540. For example, the camera 540 may be activated by executing an application using various functions (e.g., AR function), and acquire the image to be synthesized with an additional object. The acquired image may be displayed through the display (not shown) of the first electronic device 401.

In operation 803, the first electronic device 401 may analyze the acquired image. For example, the image analyzing module 511 may determine a marker form distinguishable from the surrounding environment through the histogram analysis of the acquired image. The slope of the first electronic device 401 may be detected using the sensor (not shown) of the first electronic device 401. Information of the slope of the first electronic device may be delivered to the marker determining module 512.

In operation 805, the first electronic device 401 may determine the form of the marker. For example, the form of the marker may include a color/shape/size of each region which forms the marker, or a graphic pattern of each region. For example, the marker determining module 512 may determine the marker form based on the image analysis result provided by the image analyzing module 511 or the slope information received from the second electronic device 402 (e.g., the second electronic device 402 of FIG. 6). According to one embodiment, the marker determining module 512 may determine the slope between the first electronic device 401 and the second electronic device 402, based on the slope of the first electronic device 401 and the slope of the second electronic device 402, and determine the marker form based on a relative slope between the first electronic device 401 and the second electronic device 402. The slope Information of the second electronic device 402 may be received from the second electronic device 402.

In operation 807, the first electronic device 401 may transmit information of the marker form to the second electronic device 402. For example, the communication circuitry 520 may transmit the information of the marker form determined by the marker determining module 512 to the second electronic device 402. For example, the information of the marker form may include information (e.g., color information) for storing the marker form, or information (e.g., image analysis result) necessary to determine the marker form. In various embodiments of the present invention, the first electronic device 401 may transmit the slope information of the first electronic device 401 to the second electronic device 402. The second electronic device 402 receiving the slope information of the first electronic device 401 may calculate the relative slope with the first electronic device 401.

In operation 809, the first electronic device 401 may acquire an image including a screen of the second electronic device 402 through the camera 540 after transmitting the marker form information, and detect the marker based on the acquired image. For example, the marker detecting module 513 may detect the marker with its form changed according to the surrounding from the image obtained after transmitting the marker form information to the second electronic device 402. For example, the marker detecting module 513 may capture the image acquired through the camera 540 on a frame basis, and identify the marker using a tracking algorithm using a specific value (e.g., the selected color). The marker detecting module 513 may detect the marker using a continuously adaptive mean-shift (CAMSHIFT) algorithm. While the present disclosure describes the marker detecting scheme using the CAMSHIFT algorithm, other scheme for detecting the marker may be used according to various embodiments.

The CAMSHIFT algorithm may include an algorithm for designating a search region by searching for a center point based on a color probability distribution from the Hue histogram of the HSV color space, and repeatedly conducting the process of finding a region which matches a goal target. According to various embodiments of the present invention, the marker detecting module 513 may use an API for implementing the CAMSHIFT algorithm provided by an image processing library such as OpenCV. The CAMSHIFT algorithm may be performed according to operations such as <Table 2> as below.

TABLE 2

| STEPS | OPERATION |
|---|---|
| STEP 1 | Selecting size and position of initial search window |
| STEP 2 | Determining a center position within a search region |
| STEP 3 | Calculating Hue histogram and color probability distribution of HSV color space corresponding to the search region. Disposing a search window by retrieving a center point based color probability distribution, searching a region. If converges, performing STEP 3 repeatedly. If not converge, moving to STEP 4. |
| STEP 4 | After determining a center position by detecting a rotation angle and re-adjusting a size of a search region, moving to STEP 3. |

The CAMSHIFT algorithm may be mainly used to track an object at a high speed. The CAMSHIFT algorithm may be degraded in performance under an environment (e.g., an environment where an illuminance change occur causing a change in the color information) where noise is considerable. However, in various embodiments of the present invention, the marker may be identified with a high probability even in the surrounding environment (e.g., the environment where the surrounding environment gradually darkens as shown in FIG. 11B) where the marker is outputted on the display 640 of the second electronic device 402 and the illuminance change is considerable. Since the marker of the color which is easily identified against the current surrounding environment is displayed and tracked, the performance of the CAMSHIFT algorithm may be enhanced.

According to various embodiments of the present invention, a method of an electronic device for detecting a marker may be provided. The method may include obtaining a first image including a marker displayed at another electronic device, determining a form of the marker based on analysis information of the first image, and transmitting information of the marker form to the another electronic device.

According to various embodiments of the present invention, the marker may include a first region including a pattern indicating the marker, and a second region of which the form is changed according to the analysis information of the first image.

According to various embodiments of the present invention, the marker may further include a third region of which the form is changed according to a slope of the electronic device and the another electronic device.

According to various embodiments of the present invention, the second region may be formed outside the first region, and the third region may be formed outside the second region.

According to various embodiments of the present invention, the analysis information of the first image may include information of color distribution of the first image.

According to various embodiments of the present invention, the operating method of the electronic device may include determining the form of the marker based on the color distribution of the first image.

According to various embodiments of the present invention, the operating method of the electronic device may include determining a color having smaller distribution than a specific ratio from the color distribution of the image, and determining the determined color as a color of at least part of the marker.

According to various embodiments of the present invention, the operating method of the electronic device may include obtaining information of a slope of the electronic device using at least one sensor and transmitting information of a slope of the electronic device to the another electronic device through a communication circuit.

According to various embodiments of the present invention, the operating method of the electronic device may include obtaining information of a slope of the electronic device, receiving slope information of the another electronic device from the another electronic device, identifying a relative slope of the electronic device and the another electronic device based on the slope information of the electronic device and the slope information of the another electronic device, and determining the form of the marker based on the relative slope of the electronic device and the another electronic device.

According to various embodiments of the present invention, the operating method of the electronic device may include obtaining a second image, and detecting a position of the marker in the second image based on at least one of information of the marker form and the analysis information of the first image.

Figure 9A:
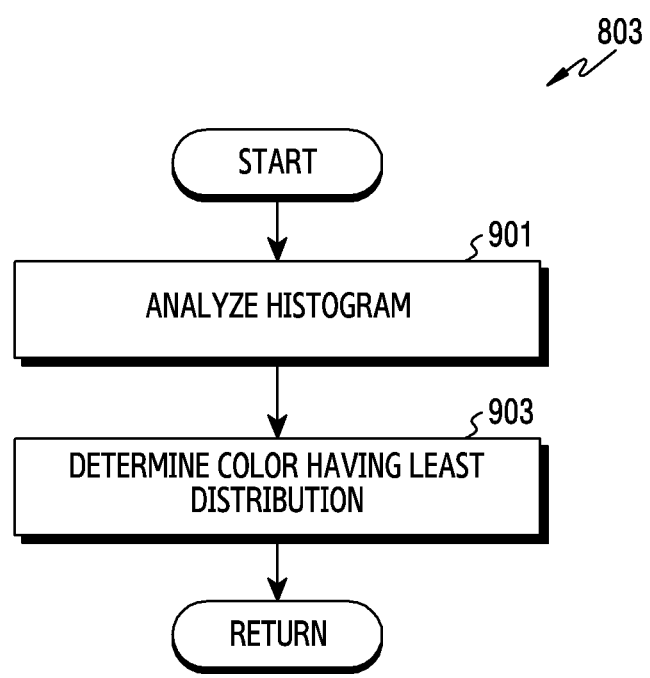
FIG. 9A illustrates an example of a flowchart for determining a color of a marker according to a surrounding environment in a first electronic device according to various embodiments of the present invention.

FIG. 9A illustrates an example of a flowchart for determining a color of a marker according to a surrounding environment in a first electronic device according to various embodiments of the present invention.

Referring to FIG. 9A, in operation 901, the first electronic device 401 (e.g., the first electronic device 401 of FIG. 5) may perform the histogram analysis on an obtained image. For example, the image analyzing module 511 may capture an image acquired through the camera 540 on the frame basis, and generate histogram data of the captured image. The image analyzing module 511 may generate the histogram data by using the image processing library such as open computer vision (OpenCV). The image analyzing module 511 may convert RGB data of the image to data of the HSV color model. Code for converting the RGB data to the HSV color may be given by <Table 3> as below.

TABLE 3 cvCvtColor(m_pImageColor, hsvimage, CV_BGR2HSV);// converting into HSV image

The image analyzing module 511 may extract a histogram image per HSV channel. In addition, the image analyzing module 511 may generate histogram information from each HSV image. Code for extracting the histogram image per HSV channel and obtaining the HSV histogram information may be given by <Table 4> as below.

Figure 9B:
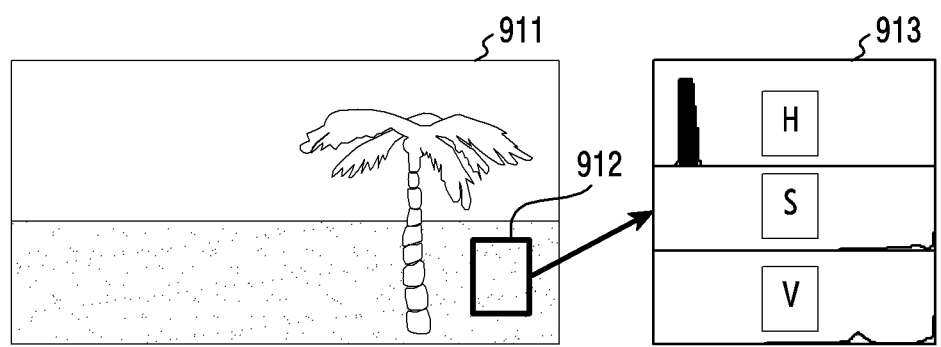
FIG. 9B illustrates an example of hue, saturation, value (HSV) analysis on an image in the first electronic device according to various embodiments of the present invention.
Figure 9C:
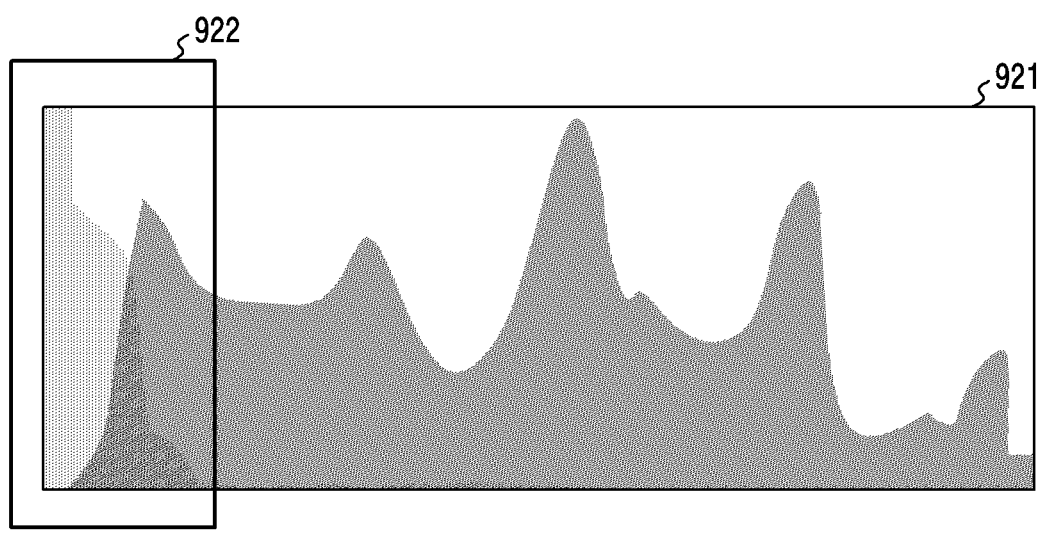
FIG. 9C illustrates an example of a color having the least distribution in the image using the HSV analysis in the first electronic device according to various embodiments of the present invention.
Figure 9D:
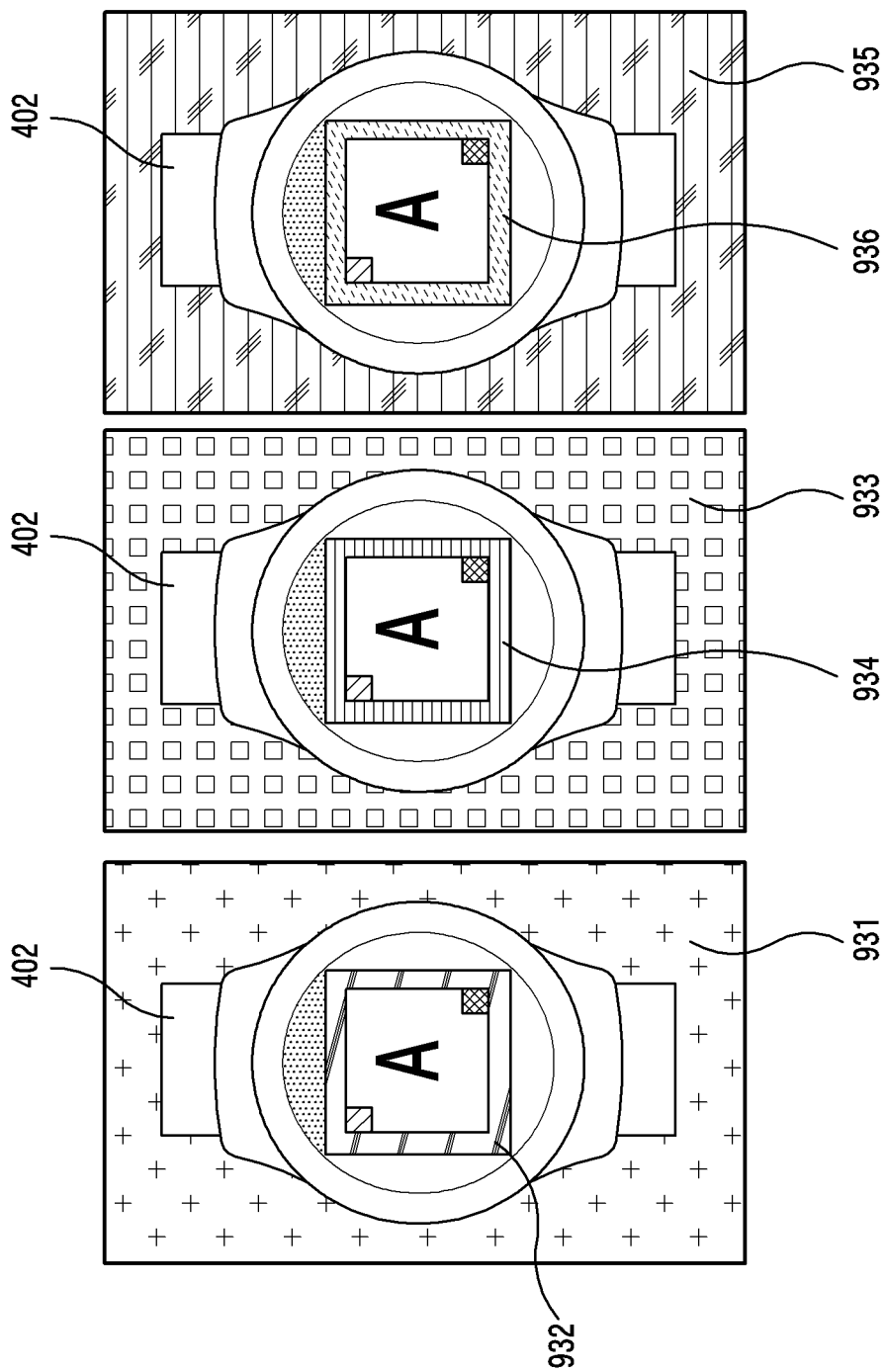
FIG. 9D illustrates an example of a marker which changes in color according to the surrounding environment in various embodiments of the present invention.

TABLE 4 m_pImageH = cvCreateImage(cvGetSize(m_pImageColor), IPL_DEPTH_8U, 1);
m_pImageS = cvCreateImage(cvGetSize(m_pImageColor), IPL_DEPTH_8U, 1);
m_pImageV = cvCreateImage(cvGetSize(m_pImageColor), IPL_DEPTH_8U, 1);
cvCvtPixToPlane(입력image, m_pImageH, m_pImageS, m_pImageV, 0);

For example, referring to FIG. 9B, the image analyzing module 511 may perform the HSV histogram analysis on a partial region 912 in the acquired image 911. According to HSV histogram analysis results, the image analyzing module 511 may acquire HSV analysis information 913.

In operation 903, the first electronic device 401 may determine the color having the least distribution. For example, referring to FIG. 9C, the image analyzing module 511 may select a color of a region 922 which occupies the least distribution in the histogram data 921. The image analyzing module 511 may select the color using an API provided by the image processing library such as OpenCV.

If converting the RGB color mode (three bytes in total) where each channel is one byte to the HSV color model (three bytes in total) where each channel is one byte, the OpenCV has values of ranges of <Table 5> as below. Since one byte may represent the value up to 255, the Hue value may use the value between 0 and 180 corresponding to half of 0 to 360.

TABLE 5

Hue (color): 0~180
Saturation (chroma): 0~255
Value (brightness): 0~255

According to various embodiments of the present invention, the image analyzing module 511 may determine the color having the least distribution using the Hue (color) value in the HSV color model. Provided that two colors are (h1, s1, v1) and (h2, s2, v2), the color of the hue range of the least frequency may be determined with the longest Euclidean distance d=|h1−h2| between space coordinates. For example, if the range of a desired target region is selected as low=60 and high=75, the actual Hue value may be determined to the color having the least green distribution between 120 and 150. By determining the color having the least distribution against the surrounding environment as the marker color, the recognition probability of the marker may be increased.

According to various embodiments of the present invention, the color of the rim region of the marker may be changed according to the color distribution of the surrounding environment. For example, referring to FIG. 9D, if the surrounding color is purple 931, the rim region of the marker may be set to teal 932. If the surrounding color is navy 933, the rim region of the marker may be set to yellow 934. If the surrounding color is aqua 935, the rim region of the marker may be set to red 936.

Figure 10:
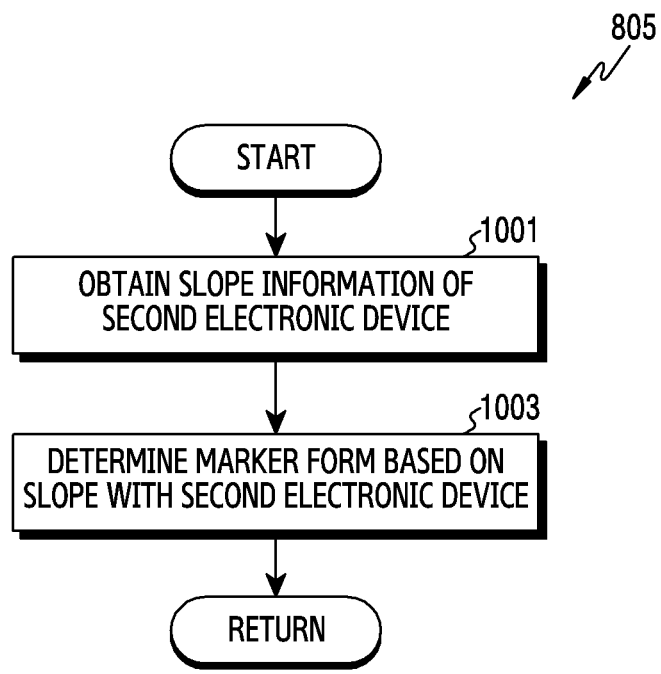
FIG. 10 illustrates an example of a flowchart for determining a form of a marker according to a slope of a second electronic device in a first electronic device according to various embodiments of the present invention.

FIG. 10 illustrates an example of a flowchart for determining a form of a marker according to a slope of a second electronic device in a first electronic device according to various embodiments of the present invention.

Referring to FIG. 10, in operation 1001, the first electronic device 401 (e.g., the first electronic device 401 of FIG. 5) may identify slope information of the second electronic device 402 (e.g., the second electronic device of FIG. 6). The slope information of the second electronic device 402 may be transmitted from the second electronic device 402 to the first electronic device 401, and the marker determining module 512 may receive the slope information of the second electronic device 402 through the communication circuitry 520. The slope information of the second electronic device 402 may include, for example, a rotation angle of the second electronic device 402 to x axis, y axis, and z axis, respectively. The marker determining module 512 may identify the slope of the first electronic device 401 by using the sensor (not shown) included in the first electronic device 401. The marker determining module 512 may determine a relative slope with the second electronic device 402 by, for example, comparing the slope of the second electronic device 402 received from the second electronic device 402 with the slope of the first electronic device 401.

In operation 1003, the first electronic device 401 may determine the form of the marker. The marker determining module 513 may determine the marker form based on at least one of analysis information of the obtained image or a relatively slope for the second electronic device 402. The marker determining module 513 may determine the marker form using only the image analysis information if it not difficult to identify the marker without an angle of view problem, and determine the marker form by considering both of the image analysis information and the relative slope if the relative slope is greater than or equal to a specific value.

According to various embodiments of the present invention, the marker determining module 513 may determine the form of some region of the marker according to the image analysis information or the relative slope for the second electronic device 402. For example, the marker determining module 513 may determine the color of some region (e.g., the second region 722 of FIG. 7C) in the marker according to the image analysis information. The marker determining module 513 may determine the color of some other region (e.g., the third regions 723 through 726 of FIG. 7C) of the marker according to the relative slope for the second electronic device 402.

According to various embodiments of the present invention, the marker determining module 513 may differently determine the form of some region of the marker according to the relative slope for each axis of the second electronic device 402. For example, the color of the upper region 723 or the lower region 724 of the third regions of FIG. 7C may be determined according to the x-axis slope of the first electronic device 401 and the second electronic device 402. The left region 725 and the right region 726 of the third regions of FIG. 7C may be determined according to the z-axis slope of the first electronic device 401 and the second electronic device 402. The marker form determined by the marker determining module 513 may be transmitted to the second electronic device 402 via the communication circuitry 520.

Figure 11A:
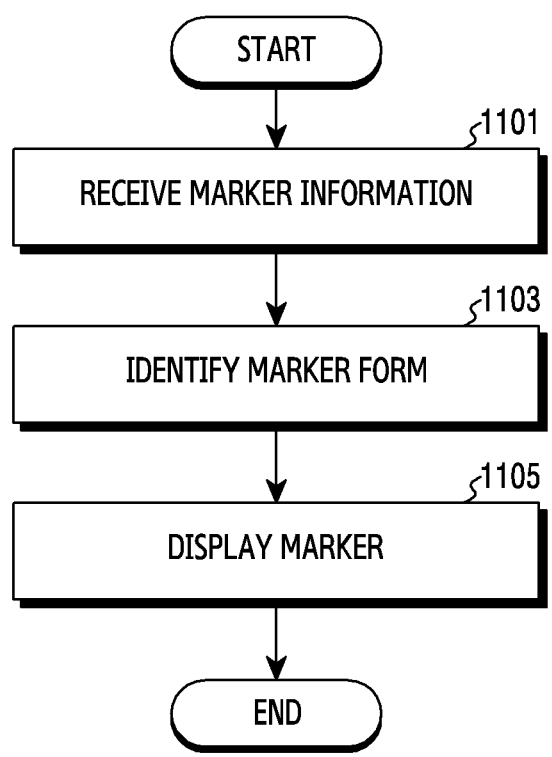
FIG. 11A illustrates an example of a flowchart for displaying a marker in a first electronic device according to various embodiments of the present invention.
Figure 11B:
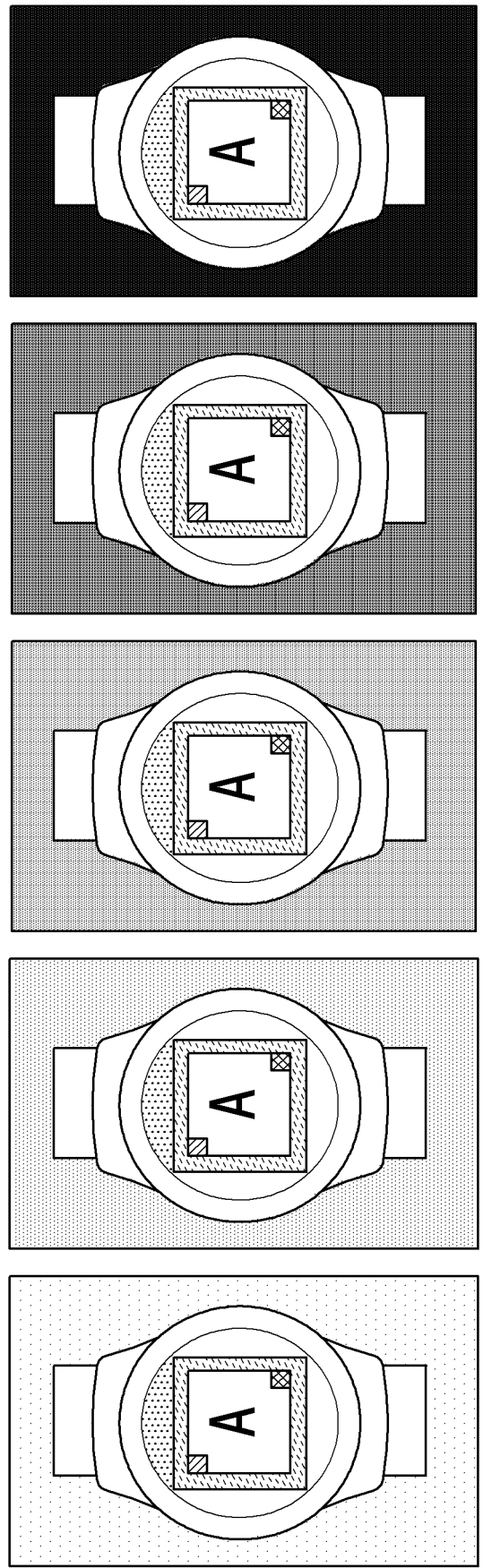
FIG. 11B illustrates an example of displaying the marker in a change around the marker which becomes dark in various embodiments of the present invention.

FIG. 11A illustrates an example of a flowchart for displaying a marker in a second electronic device 402 according to various embodiments of the present invention. FIG. 11A may illustrate an operation method of the second electronic device 402.

Referring to FIG. 11A, in operation 1101, the second electronic device 402 (e.g., the second electronic device 402 of FIG. 6) may receive marker form information from a first electronic device 401 (e.g., the first electronic device 401 of FIG. 5). According to various embodiments of the present invention, the marker form may be determined based on at least one of analysis information of an image including a marker surrounding environment or a relative slope of the first electronic device 401 and the second electronic device 402. According to various embodiments of the present invention, the marker may include a plurality of regions. Among the plurality of the regions, a first region (e.g., the first region 721 of FIG. 7C) may include, for example, a pattern of the marker. A second region (e.g., the second region 722 of FIG. 7C) may, for example, change the form (e.g., color) according to the image analysis information. A third region (e.g., the third regions 723 through 726 of FIG. 7C) may, for example, change the form (e.g., color) according to the relative slope between the first electronic device 401 and the second electronic device 402.

In operation 1103, the second electronic device 402 may identify the form of the marker. According to various embodiments of the present invention, the marker processing module 612 may identify marker form information received from the first electronic device 401, and generate a marker according to the marker form. According to various embodiments of the present invention, the marker processing module 612 may change the marker form according to the relative slope between the first electronic device 401 and the second electronic device 402. The marker processing module 612 may change the marker form according to a display form of the second electronic device 402.

In operation 1105, the second electronic device 402 may display the marker. According to various embodiments of the present invention, the display 640 may display the marker according to the display form of the marker identified in operation 1103 under control of the processor 610. According to various embodiments of the present invention, the marker processing module 612 may display the changed marker in accordance with the slope of the second electronic device 402 calculated by the slope calculating module 611. By reflecting the marker form information received from the first electronic device 401, the marker which is highly likely to be recognized by the first electronic device 401 may be displayed. For example, the recognition rate of the marker may be improved even in an environment where the surrounding screen darkens as shown in FIG. 11B.

Figure 12A:
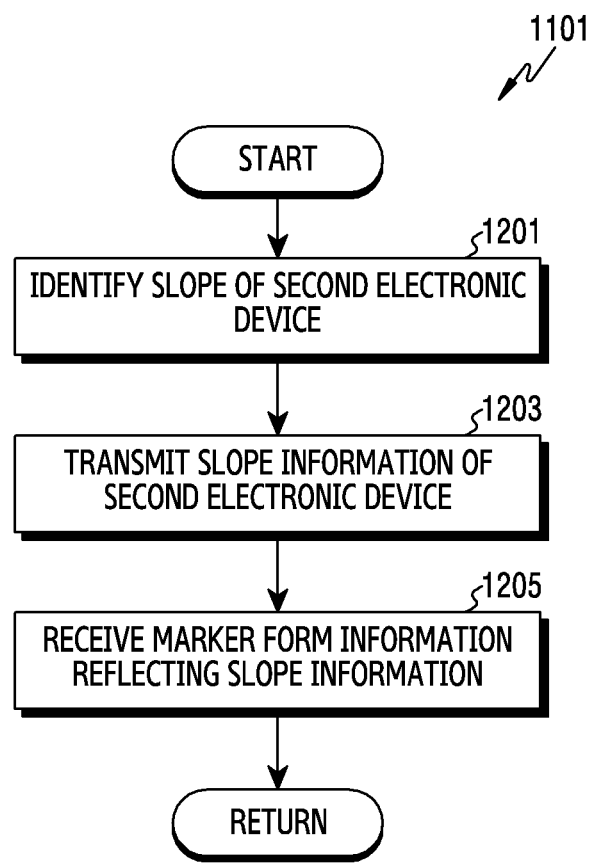
FIG. 12A illustrates an example of a flowchart for displaying a marker in a second electronic device according to various embodiments of the present invention.
Figure 12B:
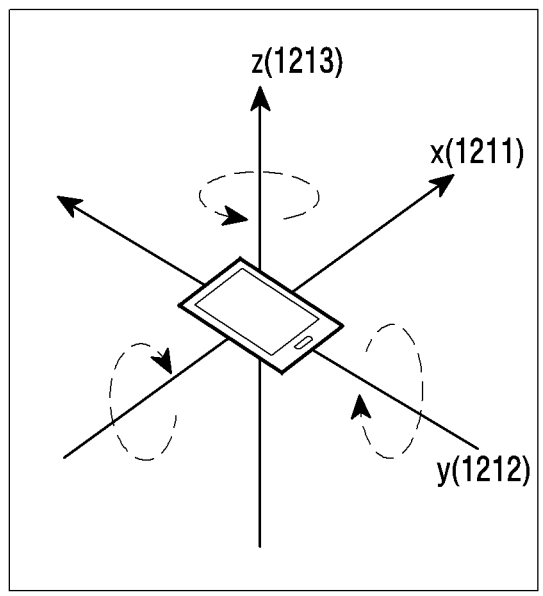
FIG. 12B illustrates an example of measuring a slope using a gyro sensor according to various embodiments of the present invention.
Figure 12C:
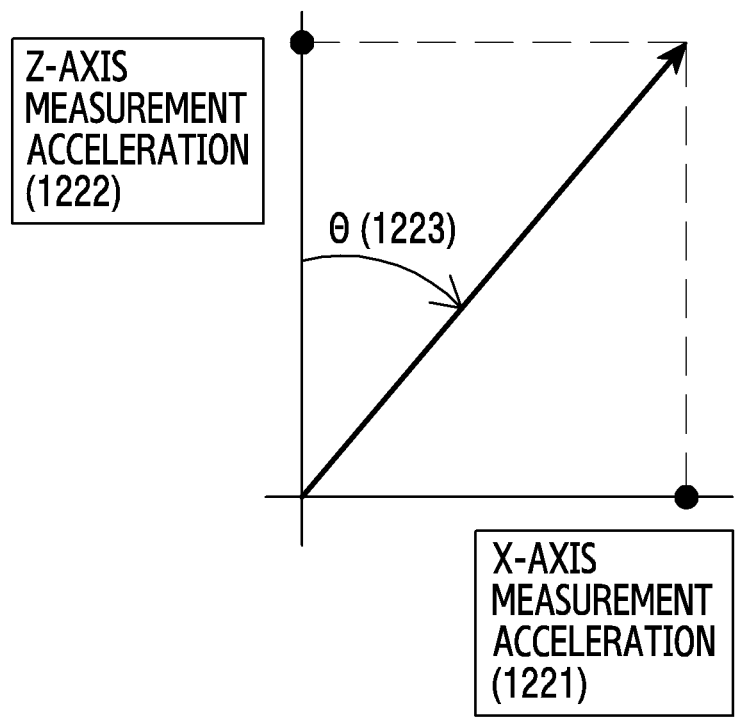
FIG. 12C illustrates an example of measuring the slope using an acceleration sensor according to various embodiments of the present invention.

FIG. 12A illustrates an example of a flowchart for changing a marker display form in a second electronic device 402 according to various embodiments of the present invention. The embodiment of FIG. 12A may illustrate the example where the second electronic device 402 (e.g., the second electronic device 402 of FIG. 6) transmits slope information of the second electronic device 402 to a first electronic device 401 (e.g., the first electronic device 401 of FIG. 5), and then the first electronic device 401 determines the form of at least a part of the marker according to the slope information.

Referring to FIG. 12A, in operation 1201, the second electronic device 402 may identify a slope of the second electronic device 402. For example, the slope calculating module 611 may calculate the slope of the second electronic device 402 for each axis (x, y, and z) by using information obtained from the sensor 650. The sensor 650 may include at least one of, for example, a gyroscope sensor or an acceleration sensor.

According to various embodiments of the present invention, the slope calculating module 611 may measure an angular velocity of rotation for each axis through the gyroscope sensor. The value per rotation axis measured by the gyroscope sensor may be provided to the slope calculating module 611 via the API provided by the OS. For example, if using Android OS, the slope calculating module 611 may acquire the angular velocity measurement value of rad/s unit through SensorEvent.

According to various embodiments of the present invention, the slope calculating module 611 may calculate the rotational angle, by calculating a distance using the speed formula ((angular velocity)*(time)=(rotational angle)) for the measured angular velocity value, and accumulating and adding (integrating) the rotational angle using the angular velocity measured for a unit time. The Android OS may calculate the rotational angle of an x axis 1211, a y axis 1212, and a z axis 1213 of FIG. 12B as shown in <Table 6>.

TABLE 6 float dT = (sensorEvent.timestamp − timestamp) * 1.0f / 1000000000.0f;
float axisX = sensorEvent.values[0];
float axisY = sensorEvent.values[1];
float axisZ = sensorEvent.values[2];
xAngle = xAngle + (axisX * dT);
yAngle = yAngle + (axisY * dT);
zAngle = zAngle + (axisZ * dT);

According to various embodiments of the present invention, the slope calculating module 611 may measure the slope of the second electronic device 402 by use of the acceleration sensor. The slope calculating module 611 may calculate the rotational angle of the second electronic device 402 using, for example, an acceleration value measured at each axis through the acceleration sensor. For example, referring to FIG. 12C, the slope calculating module 611 may measure a slope 1223 of the second electronic device 402 on a plane including the x axis and the z axis by using an acceleration value 1221 measured at the x axis and an acceleration value 1222 measured at the z axis.

In operation 1203, the second electronic device 402 may transmit the information about the slope of the second electronic device 402 to the first electronic device 401. The slope information transmitted to the first electronic device 401 may include a value indicating the slope of the second electronic device 402 for at least one of the x axis, the y axis, and the z axis measured in operation 1201. The first electronic device 401 may determine the form of the marker by reflecting the slope information received from the second electronic device 402. For example, the first electronic device 401 may determine a slope between the first electronic device 401 and the second electronic device 402, by comparing the slope of the second electronic device 402 with the slope of the first electronic device 401. Based on the slope between the first electronic device 401 and the second electronic device 402, the first electronic device 401 may determine the form (e.g., color) of at least a part of the marker.

Figure 12D:
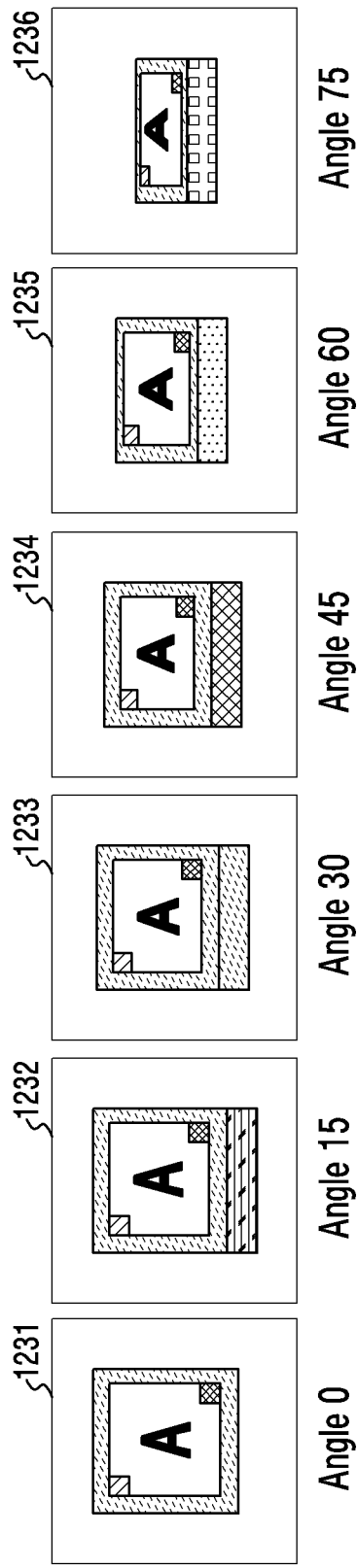
FIG. 12D illustrates an example of changing a color of a marker according to the slope according to various embodiments of the present invention.
Figure 12E:
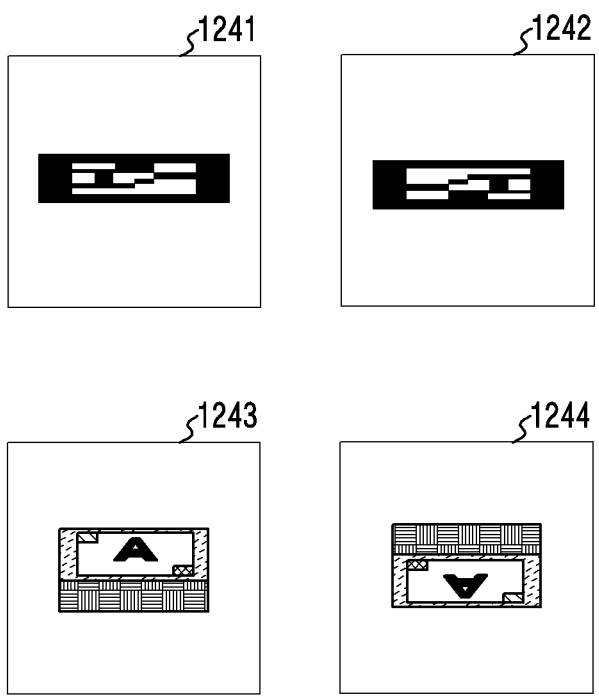
FIG. 12E illustrates an example of displaying the marker based on rotation of an electronic device according to various embodiments of the present invention.
Figure 12F:
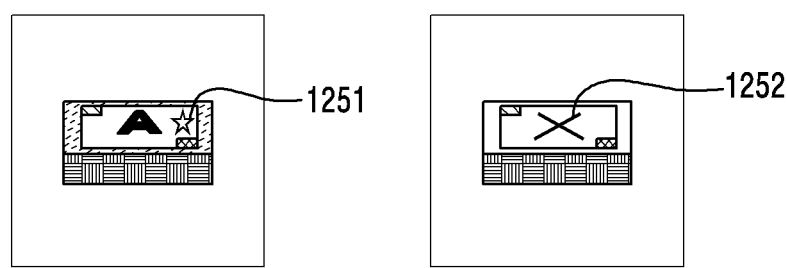
FIG. 12F illustrates an example of changing a form of the marker according to the slope according to various embodiments of the present invention.

In operation 1205, the second electronic device 402 may receive marker form information reflecting the slope information of the second electronic device 402 from the first electronic device 401. According to various embodiments of the present invention, the information received from the first electronic device 401 may include the marker form information with at least a part of the marker determined based on the slope between the first electronic device 401 and the second electronic device 402. For example, the color of the part of the marker may be changed according to the angle change of the second electronic device 402. Referring to FIG. 12D, according to various embodiments of the present invention, the marker may be determined to a marker form 1231 without color addition to the bottom if the angle of the second electronic device 402 is 0°. The color of the bottom region of the marker may be determined to aqua 1232 for 15°, to red 1233 for 30°, to green 1234 for 45°, to olive 1235 for 60°, and to navy 1236 for 75°, according to the angle of the second electronic device 402. The color of the marker based on the angle of the second electronic device 402 may be set as shown in <Table 7> as below.

TABLE 7

| Name of color | Corresponding angle range |
| --- | --- |
| White | 0 |
| Silver | ~6 |
| Gray | ~12 |
| Aqua | ~18 |
| Maroon | ~24 |
| Red | ~30 |
| Purple | ~36 |
| Fuchsia | ~42 |
| Green | ~48 |
| Lime | ~54 |
| Olive | ~60 |
| Yellow | ~66 |
| Navy | ~72 |
| Blue | ~78 |
| Teal | ~84 |
| Black | ~90 |

According to various embodiments of the present invention, the first electronic device 401 may identify whether the marker includes the color corresponding to the angle over 75 degrees after detecting the marker. If the detected marker includes the color corresponding to the angle over 75 degrees, the first electronic device 401 may correct the marker detection result by comparing the angle corresponding to the corresponding color with a rotation value calculation result identified using the image processing library.

According to various embodiments of the present invention, to calculate a position or an orientation of the camera from the image, the first electronic device 401 may calculate the position or the orientation of the camera from the image, by using intrinsic parameters and a skew coefficient for the camera and at least four or more three-dimensional coordinate values for the marker and their corresponding two-dimensional image coordinate values. In the calculation process, if the target and the camera are at a high angle over 75 degrees, the two-dimensional image coordinate value is too small and there may be difficulty in calculating the slope information of the marker. For example, difficulty may arise in the marker recognition because the calculated x axis is upside down due to the reduced marker recognition area such as markers 1241 and 1242 not including the region of the different color according to the slope in FIG. 12E. According to various embodiments of the present invention, if detecting a difference by comparing the angle value result calculated using the image processing library with the visualized slope color value displayed from the marker and identifying that the angle with the second electronic device 402 displaying the marker is the condition over 75 degrees from the color of the part of the marker, the first electronic device 401 may identify the slope of the marker using the slope value obtained from the color corresponding to the part of the marker, such as markers 1243 and 1244 of FIG. 12E.

According to various embodiments of the present invention, the marker may change not only the color but also the pattern of the marker according to the slope between the first electronic device 401 and the second electronic device 402. For example, referring to FIG. 12F, if the slope between the first electronic device 401 and the second electronic device 402 exceeds a specific angle (e.g., 75 degrees), an indicator 1251 indicating that the marker angle exceeds the specific angle may be added. The color of the indicator 1251 may be determined to, for example, a color which does not exist in the surrounding, based on the image analysis result. If the slope between the first electronic device 401 and the second electronic device 402 exceeds the specific angle, the pattern of the marker may be changed to a different pattern 1252.

The flowchart of FIG. 12A illustrates the example where the second electronic device 402 transmits the slope of the second electronic device 402 to the first electronic device 401 and the first electronic device 401 determines the form of the marker. According to another embodiment of the present invention, the second electronic device 402 may change the form of the marker to display at the second electronic device 402 based on the slope information of the second electronic device 402, without transmitting the slope information of the second electronic device 402 to the first electronic device 401. According to another embodiment of the present invention, the second electronic device 402 may receive slope information of the first electronic device 401 from the first electronic device 401, and calculate a relative slope with the first electronic device 401 based on the slope information of the first electronic device 401. The second electronic device 402 may change the form of at least a part of the marker based on the relative slope with the first electronic device 401.

According to various embodiments of the present invention, an operating method of an electronic device for displaying a marker may be provided. The operating method of the electronic device may include receiving information of a marker form from another electronic device, and displaying a marker determined based on the marker form information.

According to various embodiments of the present invention, the operating method of the electronic device may include determining a slope of the electronic device sensor, and determining the form of at least part of the marker based on the slope of the electronic device.

According to various embodiments of the present invention, the operating method of the electronic device may include receiving slope information of the another electronic device from the another electronic device, determining a slope between the electronic device and the another electronic device, by comparing the slope of the electronic device with the slope of the another electronic device, and changing the form of at least part of the marker based on the slope between the electronic device and the another electronic device.

According to various embodiments of the present invention, the operating method of the electronic device may include identifying a form of a panel of the display, and displaying the marker changed based on the form of the panel of the display and the marker form received from the another electronic device.

The term "module" used in the present disclosure includes a unit including hardware, software, or firmware, and, for example, may be interchangeably used with terms such as logic, logical block, component, or circuit. "module" may be an integral component or a minimum unit for performing one or more functions or its part. "module" may be mechanically or electrically implemented, and, for example, may include an application-specific integrated circuit (ASIC) chip, a field-programmable gate arrays (FPGAs), and a programmable-logic device, which are known or will be developed, for conducting certain operations. At least part of a device (e.g., modules or functions thereof) or a method (e.g., operations) according to various embodiments may be implemented with an instruction stored in a computer-readable storage medium (e.g., the memory 130) in the form of a program module. If the instruction is executed by a processor (e.g., the processor 120), the processor may perform a function corresponding to the instruction. The computer-readable recording medium may include a hard disk, a floppy disc, a magnetic medium (e.g., a magnetic tape), an optical storage medium (e.g., a compact disc-ROM (CD-ROM) or a DVD, a magnetic-optic medium (e.g., a floptical disc)), and an internal memory. The instruction may include code created by a compiler or code executable by an interpreter. The module or program module according to various embodiments may include at least one or more components of the aforementioned components, omit some of them, or further include additional other components. Operations performed by the module, the program, or another component according to various embodiments may be carried out sequentially, in parallel, repeatedly, or heuristically, or at least some operations may be executed in a different order or omitted, or other operations may be added.

According to various embodiments of the present invention, a non-transitory computer readable medium for storing instructions to detect a marker may be provided. The instructions, if executed by a processor, may be configured to cause the processor to perform obtaining a first image including a marker displayed at another electronic device, determining a form of the marker based on analysis information of the first image, and transmitting information of the marker form to the another electronic device.

According to various embodiments of the present invention, the marker may include a first region including a pattern indicating the marker, and a second region of which the form is determined according to the analysis information of the first image.

According to various embodiments of the present invention, the marker may further include a third region of which the form is determined based on a slope of the electronic device and the another electronic device.

According to various embodiments of the present invention, the second region may be formed outside the first region, and the third region may be formed outside the second region.

According to various embodiments of the present invention, the analysis information of the first image may include information of color distribution of the first image.

According to various embodiments of the present invention, the instructions may be configured to cause the processor to determine the form of the marker based on the color distribution of the first image.

According to various embodiments of the present invention, the instructions may be configured to cause the processor to determine a color having smaller distribution than a specific ratio from the color distribution of the image, and determine the determined color as a color of at least part of the marker.

According to various embodiments of the present invention, the instructions may be configured to cause the processor to obtain information of a slope of the electronic device using the at least one sensor, and transmit the slope information of the electronic device to the another electronic device through the communication circuitry.

According to various embodiments of the present invention, the instructions may be configured to cause the processor to obtain information of a slope of the electronic device using the at least one sensor, receive slope information of the another electronic device from the another electronic device through the communication circuitry, identify a relative slope of the electronic device and the another electronic device based on the slope information of the electronic device and the slope information of the another electronic device, and determine the form of the marker based on the relative slope of the electronic device and the another electronic device.

According to various embodiments of the present invention, the instructions may be configured to cause the processor to obtain a second image from the camera, and detect a position of the marker in the second image based on at least one of information of the marker form and the analysis information of the first image.

According to various embodiments of the present invention, a non-transitory computer readable medium for storing instructions to display a marker may be provided. The instructions may provide an operating method of an electronic device for displaying the marker. The operating method of the electronic device may include receiving information of a marker form from another electronic device, and displaying a marker determined based on the marker form information.

According to various embodiments of the present invention, the instructions may be configured to cause the processor to determine a slope of the electronic device sensor, and determine the form of at least part of the marker based on the slope of the electronic device.

According to various embodiments of the present invention, the instructions may be configured to cause the processor to receive slope information of the another electronic device from the another electronic device, determine a slope between the electronic device and the another electronic device, by comparing the slope of the electronic device with the slope of the another electronic device, and change the form of at least part of the marker based on the slope between the electronic device and the another electronic device.

According to various embodiments of the present invention, the instructions may be configured to cause the processor to identify a form of a panel of the display, and display the marker changed based on the form of the panel of the display and the marker form received from the another electronic device.

In the specific embodiments of the present invention as described above, the elements included in the electronic device are expressed in a singular or plural form according to the specific embodiment. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present invention has been described with reference to certain embodiments thereof, but various modifications may be made without departing from the scope of the present invention. Therefore, the scope of the present invention should not be limited to the described embodiments but should be defined by the claims as below and their equivalents within the scope of the claims.

The invention claimed is:

1. An electronic device comprising:
   at least one sensor;
   a display;
   a camera;
   at least one processor coupled with the at least one sensor, the display, and the camera; and
   communication circuitry coupled with the at least one processor,
   wherein the at least one processor is configured to,
   obtain a first image comprising a marker displayed at another electronic device through the camera,
   identify a color having smaller distribution than a specific ratio from color distribution of the first image,
   determine the identified color as a color of at least part of the marker, and
   transmit information of the marker color to the another electronic device through the communication circuitry.

2. The electronic device of claim 1, wherein the marker comprises,
   a first region comprising a pattern indicating the marker, and
   a second region of which the color is determined according to the color distribution of the first image.

3. The electronic device of claim 2, wherein the marker further comprises,
   a third region of which the color is determined based on a slope of the electronic device and the another electronic device.

4. The electronic device of claim 3, wherein, the second region is formed outside the first region, and the third region is formed outside the second region.

5. The electronic device of claim 1, wherein the at least one processor is further configured to:
   obtain information of a slope of the electronic device using the at least one sensor, and
   transmit the slope information of the electronic device to the another electronic device through the communication circuitry.

6. The electronic device of claim 1, wherein the at least one processor is configured to,
   obtain information of a slope of the electronic device using the at least one sensor,
   receive slope information of the another electronic device from the another electronic device through the communication circuitry,
   identify a relative slope of the electronic device and the another electronic device based on the slope information of the electronic device and the slope information of the another electronic device, and
   determine the color of the marker based on the relative slope of the electronic device and the another electronic device.

7. The electronic device of claim 1, wherein the at least one processor is configured to,
   obtain a second image from the camera, and
   detect a position of the marker in the second image based on at least one of information of the marker color and the color distribution of the first image.

8. An operating method of an electronic device, comprising:
   obtaining a first image comprising a marker displayed at another electronic device;

identifying a color having smaller distribution than a specific ratio from color distribution of the first image;

determining the identified color as a color of at least part of the marker; and transmitting information of the marker color to the another electronic device.

9. The method of claim 8, wherein the marker comprises, a first region comprising a pattern indicating the marker, and a second region of which the color is changed according to the color distribution of the first image.

10. The method of claim 9, wherein the marker comprises a third region of which the color is changed according to a slope of the electronic device and the another electronic device.

11. The method of claim 10, wherein the second region is formed outside the first region, and wherein the third region is formed outside the second region.

12. The method of claim 8, wherein determining the color of the marker comprises:

obtaining information of a slope of the electronic device;

receiving slope information of the another electronic device from the another electronic device;

identifying a relative slope of the electronic device and the another electronic device based on the slope information of the electronic device and the slope information of the another electronic device; and determining the color of the marker based on the relative slope of the electronic device and the another electronic device.

13. The method of claim 8, comprising:

obtaining a second image; and determining a position of the marker in the second image based on at least one of information of the marker color and the color distribution of the first image.

14. The method of claim 8, further comprising:

obtaining information of a slope of the electronic device using the at least one sensor, and transmitting the slope information of the electronic device to the another electronic device through a communication circuitry.

\* \* \* \* \*